(12) United States Patent
Huang et al.

(10) Patent No.: US 10,862,635 B2
(45) Date of Patent: Dec. 8, 2020

(54) COMMUNICATION METHOD AND COMMUNICATION APPARATUS

(71) Applicant: Panasonic Intellectual Property Management Co., Ltd., Osaka (JP)

(72) Inventors: Lei Huang, Singapore (SG); Hong Cheng Michael Sim, Singapore (SG); Yoshio Urabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 75 days.

(21) Appl. No.: 15/890,863

(22) Filed: Feb. 7, 2018

(65) Prior Publication Data

US 2018/0167177 A1    Jun. 14, 2018

Related U.S. Application Data

(63) Continuation of application No. PCT/JP2016/003421, filed on Jul. 22, 2016.

(30) Foreign Application Priority Data

Aug. 31, 2015 (JP) .................................. 2015-170514

(51) Int. Cl.
*H04W 4/00* (2018.01)
*H04L 5/00* (2006.01)
(Continued)

(52) U.S. Cl.
CPC ......... *H04L 5/0023* (2013.01); *H04B 7/0404* (2013.01); *H04B 7/0452* (2013.01); *H04B 7/0617* (2013.01); *H04B 7/0632* (2013.01); *H04B 7/0639* (2013.01); *H04L 5/006* (2013.01); *H04L 5/0028* (2013.01); *H04L 5/0091* (2013.01); *H04L 25/0224* (2013.01); *H04W 72/085* (2013.01); *H04W 84/12* (2013.01);
(Continued)

(58) Field of Classification Search
None
See application file for complete search history.

(56) References Cited

U.S. PATENT DOCUMENTS 8,547,955 B2 * 10/2013 Niu ...................... H04B 7/0417
                                                              370/345
2007/0286303 A1 * 12/2007 Yamaura .............. H04B 7/0421
                                                              375/267

(Continued)

FOREIGN PATENT DOCUMENTS

JP      2014-168303 A     9/2014
WO      2013/169389 A1   11/2013

OTHER PUBLICATIONS

The Extended European Search Report dated Dec. 14, 2018 for the related European Patent Application No. 16841038.9.
(Continued)

*Primary Examiner* — Bob A Phunkulh
(74) *Attorney, Agent, or Firm* — Seed IP Law Group LLP

(57) ABSTRACT

A communication method of the present disclosure comprises transmitting a sounding frame comprising a training signal; and receiving a first feedback frame from a communication partner device, the first feedback frame comprising first beamforming feedback information, wherein the first feedback frame is transmitted together with at least one second feedback frame by multiuser transmission.

16 Claims, 15 Drawing Sheets

(51) Int. Cl.
  *H04W 84/12* (2009.01)
  *H04B 7/0404* (2017.01)
  *H04B 7/0452* (2017.01)
  *H04W 72/08* (2009.01)
  *H04B 7/06* (2006.01)
  *H04L 25/02* (2006.01)
  *H04W 16/28* (2009.01)
  *H04W 72/04* (2009.01)

(52) U.S. Cl.
  CPC .............. *H04B 7/065* (2013.01); *H04B 7/066* (2013.01); *H04B 7/0623* (2013.01); *H04B 7/0634* (2013.01); *H04L 5/0048* (2013.01); *H04W 16/28* (2013.01); *H04W 72/046* (2013.01); *H04W 72/0453* (2013.01)

(56) References Cited

U.S. PATENT DOCUMENTS

| | | | | |
|---|---|---|---|---|
| 2007/0298742 | A1* | 12/2007 | Ketchum | H04B 7/0617 455/186.1 |
| 2010/0220679 | A1* | 9/2010 | Abraham | H04W 74/06 370/329 |
| 2010/0260060 | A1* | 10/2010 | Abraham | H04L 25/03343 370/252 |
| 2011/0128947 | A1* | 6/2011 | Liu | H04L 25/03343 370/338 |
| 2011/0261708 | A1* | 10/2011 | Grandhi | H04W 4/06 370/252 |
| 2011/0274003 | A1* | 11/2011 | Pare, Jr. | H04B 7/0452 370/252 |
| 2012/0087426 | A1* | 4/2012 | Zhang | H04L 1/0693 375/260 |
| 2012/0106531 | A1* | 5/2012 | Seok | H04B 7/0452 370/338 |
| 2012/0155415 | A1* | 6/2012 | Seok | H04B 7/0452 370/329 |
| 2012/0300864 | A1* | 11/2012 | Merlin | H04B 7/0617 375/260 |
| 2012/0300874 | A1* | 11/2012 | Zhang | H04L 5/0048 375/295 |
| 2013/0308713 | A1* | 11/2013 | Zhang | H04B 7/0634 375/267 |
| 2014/0056204 | A1* | 2/2014 | Suh | H04W 72/1226 370/312 |
| 2014/0247746 | A1* | 9/2014 | You | H04W 24/06 370/252 |
| 2014/0269964 | A1* | 9/2014 | Du | H04B 7/0452 375/267 |
| 2015/0110046 | A1 | 4/2015 | Merlin et al. | |
| 2015/0146807 | A1* | 5/2015 | Zhang | H04L 5/0007 375/260 |
| 2015/0146812 | A1 | 5/2015 | Chu et al. | |
| 2015/0372795 | A1* | 12/2015 | Wu | H04L 5/0057 370/329 |
| 2016/0242195 | A1* | 8/2016 | Kwon | H04W 72/121 |
| 2016/0249366 | A1* | 8/2016 | Seok | H04B 7/024 |
| 2016/0373171 | A1* | 12/2016 | Patwardhan | H04B 7/0452 |
| 2017/0170937 | A1* | 6/2017 | Chun | H04L 5/0048 |
| 2017/0273112 | A1* | 9/2017 | Lou | H04W 74/0825 |

OTHER PUBLICATIONS

International Search Report of PCT application No. PCT/JP2016/003421 dated Oct. 11, 2016.

IEEE 802.11-15/0132r7, Specification Framework for TGax, Jul. 20, 2015.

IEEE 802.11-15/0579r3, 802.11ax Preamble Design and Auto-detection, Jul. 13, 2015.

IEEE Std 802.11ac(TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 18, 2013.

Songnan Xi et al., "Transmit Beamforming and Detection Design for Uplink Multiuser MIMO System", Proceedings of Fortieth Asilomar Conference on Signals, Systems and Computers, 2006 (ACSSC '06), Oct. 29, 2006, pp. 1593-1600.

IEEE Std 802.11n(TM)-2009, IEEE Standard for Information technology—Telecommunications and information exchange between systems—Local and metropolitan area networks—Specific requirements, Part 11: Wireless LAN Medium Access Control(MAC) and Physical Layer (PHY) Specifications, Amendment 5: Enhancements for Higher Throughput, Oct. 29, 2009.

* cited by examiner

COMMUNICATION METHOD AND COMMUNICATION APPARATUS

BACKGROUND

1. Technical Field

The present disclosure generally pertains to communication networks and, more particularly, to sounding method in wireless local area networks based on OFDMA (Orthogonal Frequency Division Multiple Access) and MU-MIMO (Multi-User Multiple Input Multiple Output).

2. Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios while keeping backward compatibility with legacy 802.11a/g/n/ac standards. MU-MIMO (Multi-User Multiple Input Multiple Output) and OFDMA (Orthogonal Frequency Division Multiple Access) transmission have been envisioned as two of the most important features in 802.11ax See, for example, IEEE Std 802.11ac-2013 and IEEE Std 802.11n-2009.

SUMMARY

Studies are underway to perform efficient sounding for UL (Up Link) MU (Multi-User) communications in 802.11ax, e.g., UL OFDMA communications or UL MU-MIMO communications.

In one general aspect, the techniques disclosed here feature a communication method comprising transmitting a sounding frame comprising a training signal and receiving a first feedback frame from a communication partner device, the first feedback frame comprising first beamforming feedback information, wherein the first feedback frame is transmitted together with at least one second feedback frame by multiuser transmission.

With the present disclosure, it is possible to achieve efficient sounding for UL MU transmission.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Various embodiments of the present disclosure will now be described in detail with reference to the annexed drawings. In the following description, a detailed description of known functions and configurations has been omitted for clarity and conciseness.

<Underlying Knowledge Forming Basis of the Present Disclosure>

Figure 1:
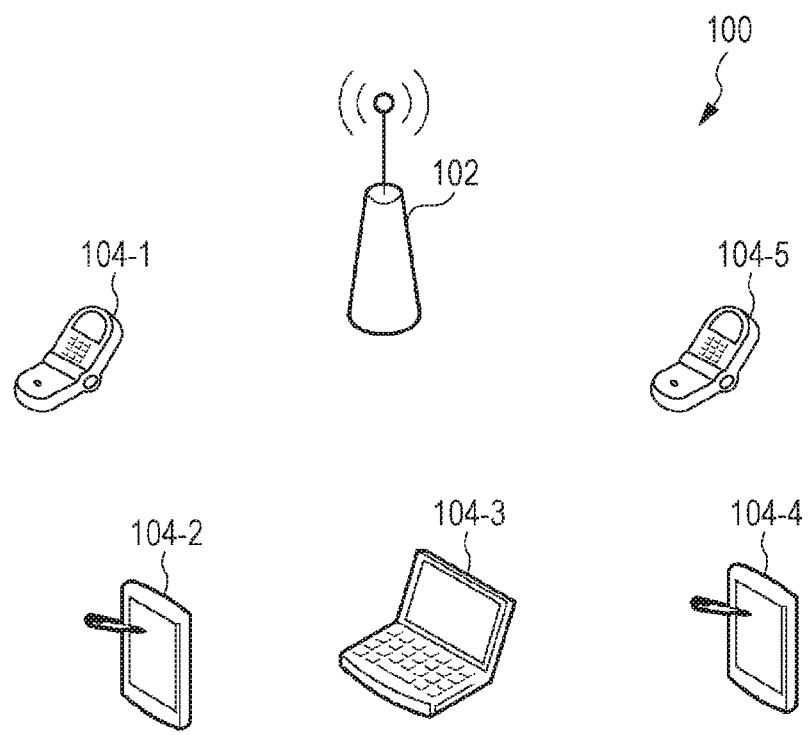
FIG. 1 shows a diagram illustrating an example WLAN.

FIG. 1 is a diagram of an example WLAN (Wireless Local Area Network) 100. The WLAN 100 comprises an AP (Access Point) 102 and a plurality of STAs (Stations) 104 that are associated with the AP 102. In the downlink (DL) of the WLAN 100, the AP 102 may be configured to transmit respective data stream to multiple STAs 104 simultaneously via DL MU communications (i.e., DL MU-MIMO or DL OFDMA communications). Similarly, in the uplink (UL) of the WLAN 100, multiple STAs 104 can transmit respective data streams to the AP 102 simultaneously via UL MU communications (i.e., UL MU-MIMO or UL OFDMA communications).

As for DL or UL OFDMA communications, data streams are transmitted simultaneously to or by a group of STAs over respective subbands, each of which comprises a plurality of subcarriers. A data stream may be transmitted to or by a single STA over a specific subband using SU-MIMO (Single User MIMO) technique. Alternatively, data streams may be transmitted simultaneously to or by multiple STAs over a specific subband using MU-MIMO technique.

As for DL or UL MU-MIMO communications, data streams are transmitted simultaneously to or by a group of STAs over the entire bandwidth using MU-MIMO technique.

In SU-MIMO technique, transmit beamforming matrices may be used to precode data for a particular STA such that the link throughput is maximized at the receiver output of the particular STA. In MU-MIMO technique, respective transmit beamforming matrices may be used to precode respective data streams for each STA in a group of STAs, such that the total throughput (e.g., the sum performance or max-min fairness) is maximized. For a particular STA, transmit beamforming matrices used for MU-MIMO transmission are generally different from their counterparts for SU-MIMO transmission since the former needs to take into account multiuser interference that exists in MU-MIMO transmission. In summary, prior to any DL or UL MU transmission, the AP 102 needs to interact with the STAs 104 via a sounding procedure to make necessary preparations, such as user grouping, subband allocation, and development of transmit beamforming matrices, etc.

Figure 2:
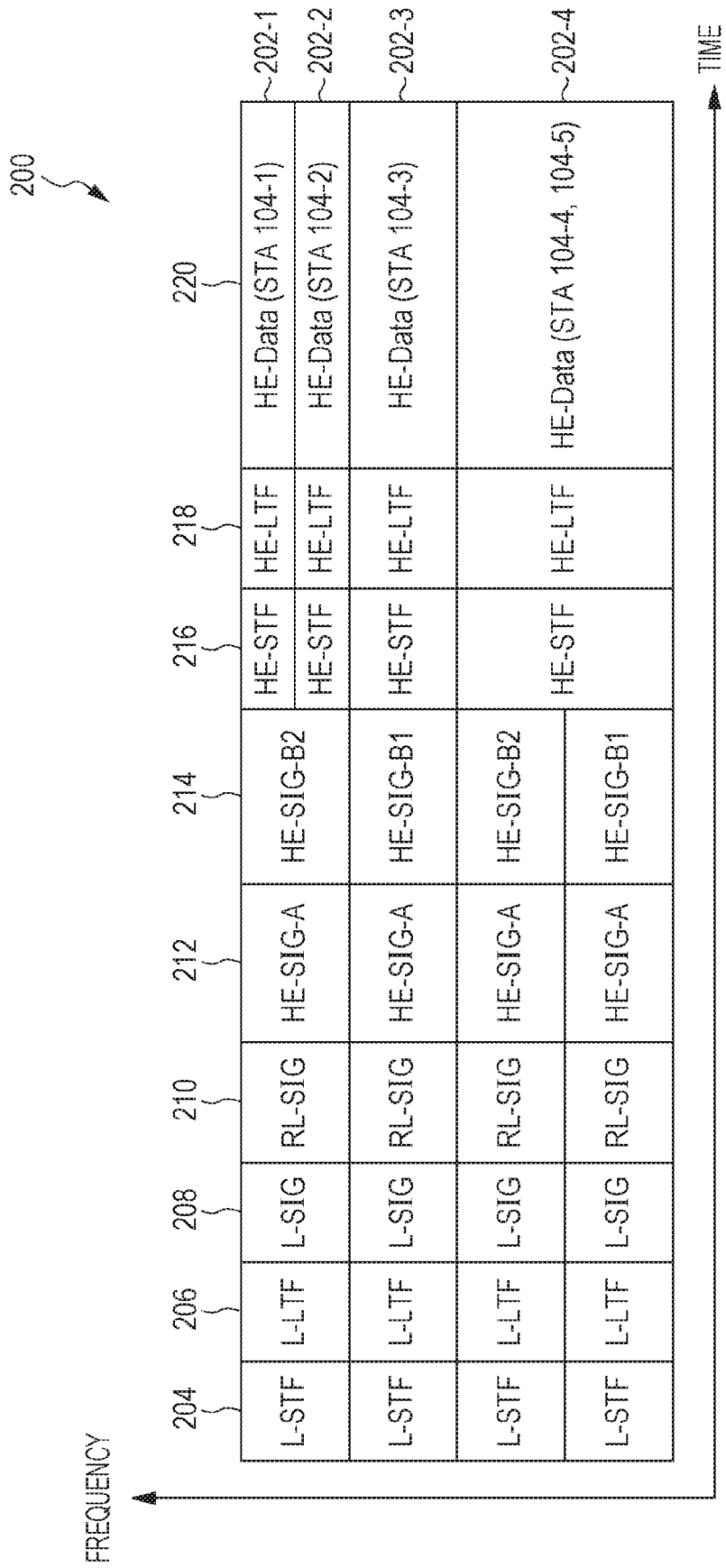
FIG. 2 shows a diagram illustrating an example PPDU according to the prior art.

FIG. 2 is a diagram of an example Physical Layer Protocol Data Unit (PPDU) 200 according to the prior art [see IEEE 802.11-15/0132r7, Specification Framework for TGax, July 2015 and IEEE 802.11-15/0579r3, 802.11ax Preamble Design and Auto-detection, July 2015]. The PPDU 200 is an OFDMA PPDU which includes four OFDM data units 202-1, 202-2, 202-3 and 202-4 in an 80 MHz channel bandwidth. In context of DL MU transmission, the PPDU 200 is generated by the AP 102 in FIG. 1, such that the OFDM data unit 202-1 is transmitted to the STA 104-1 over a first 10 MHz subband, the OFDM data unit 202-2 is transmitted to the STA 104-2 over a second 10 MHz subband, the OFDM data unit 202-3 is transmitted to the STA 104-3 over a 20 MHz subband and the OFDM data unit 202-4 is transmitted to the STAs 104-4 and 104-5 over a 40 MHz subband. In context of UL MU transmission, on the other hand, the PPDU 200 is generated by the STAs 104 collectively such that the OFDM data unit 202-1 is transmitted by the STA 104-1 to the AP 102 over a first 10 MHz subband, the OFDM data unit 202-2 is transmitted by the STA 104-2 to the AP 102 over a second 10 MHz subband, the OFDM data unit 202-3 is transmitted by the STA 104-3 to the AP 102 over a 20 MHz subband and the OFDM data unit 202-4 is transmitted by the STAs 104-4 and 104-5 to the AP 102 over a 40 MHz subband.

It should be noted that if a PPDU only includes a single OFDM data unit which is transmitted by or to the AP 102 over the entire bandwidth using MU-MIMO technique, the PPDU becomes a DL or UL MU-MIMO PPDU. If a PPDU only includes a single OFDM data unit which is transmitted by or to the AP 102 over the entire bandwidth using a technique other than MU-MIMO, the PPDU becomes a DL or UL SU PPDU.

As illustrated in FIG. 2, the PPDU 200 comprises a legacy short training field (L-STF) 204, a legacy long training field (L-LTF) 206, a legacy signal field (L-SIG) 208, a repeated legacy signal field (RL-SIG) 210, a first high efficiency signal field (HE-SIG-A) 212, a second high efficiency signal field (HE-SIG-B) 214, a high efficiency short training field (HE-STF) 216, a high efficiency long training field (HE-LTF) 218 and a high efficiency data portion (HE Data) 220. The L-STF 204, L-LTF 206 and L-SIG 208 facilitate backward compatibility with legacy 802.11a/g/n/ac standards. The RL-SIG 210 is used for auto-detection of the frame format of the PPDU 200. Each of the HE-SIG-A 212 and the HE-SIG-B 214 carries control information required to interpret the PPDU 200, e.g., channel bandwidth. In particular, the HE-SIG-B 214 contains control information for designated receiving STAs especially for DL MU transmission. The HE-SIG-B 214 is partitioned into two portions: HE-SIG-B1 and HE-SIG-B2, which carry different control signaling. The HE-SIG-B 214 does not exist in the PPDU 200 if it is an UL MU PPDU, DL SU PPDU or UL SU PPDU. The HE-STF 216 is used to train AGC (Automatic Gain Control) for receiving the HE Data portion 220 of a corresponding OFDM data unit 202. The HE-LTF 218 comprises a plurality of HE-LTF symbols and is used to generate MIMO channel estimate for receiving and equalizing the HE Data portion 220 of the corresponding OFDM data unit 202.

The L-STF 204, L-LTF 206, L-SIG 208, RL-SIG 210, HE-SIG-A 212 and HE-SIG-B 214 occupy a smallest bandwidth supported by the WLAN 100 (e.g., 20 MHz). If the PPDU 200 occupies a bandwidth that is greater than the smallest bandwidth of the WLAN 100, then the L-STF 204, L-LTF 206, L-SIG 208, RL-SIG 210 and HE-SIG-A 212 may be duplicated and mapped in each smallest bandwidth portion of the PPDU 200 (e.g., in each 20 MHz portion of the PPDU 200). The HE-SIG-B1 and HE-SIG-B2 of HE-SIG-B 214 may alternatively be duplicated and mapped in each smallest bandwidth portion of the PPDU 200.

On the other hand, the HE-STF 216, the HE-LTF 218 and the HE Data portion 220 occupy an entire bandwidth of the corresponding OFDM data unit 202. For example, the OFDM data unit 202-4 occupies 40 MHz, wherein the HE-STF 216, HE-LTF 218 and HE data portion 220 occupy the entire 40 MHz bandwidth of the OFDM data unit 202-4.

Figure 3:
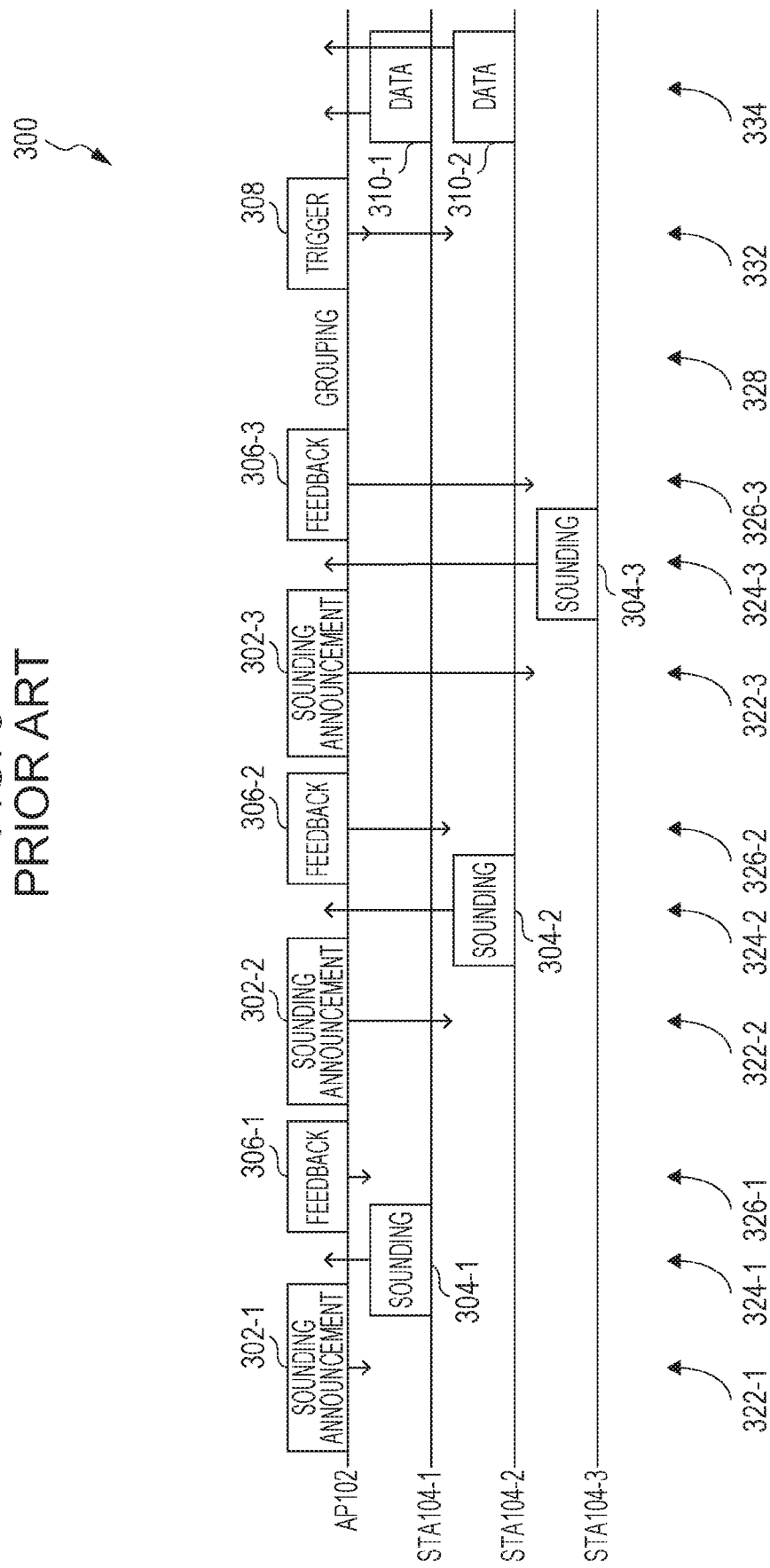
FIG. 3 shows a schematic timing diagram illustrating an example sounding procedure and an example UL MU-MIMO transmission based on the example sounding procedure, according to the prior art.

FIG. 3 is a schematic timing diagram illustrating an example sounding procedure 300 and an example UL MU-MIMO transmission based on the sounding procedure 300, according to the prior art (see U.S. Patent Application No. 2015/0146812A1). The sounding procedure 300 is an explicit sounding procedure in which the AP 102 derives a channel estimate corresponding to a communication channel from a STA to the AP 102 directly from a sounding frame transmitted by the STA to the AP 102.

During a time interval 322-1, the AP 102 transmits a sounding announcement frame 302-1 to the STA 104-1 to request the STA 104-1 to transmit a sounding frame. During a time interval 324-1, in response to receiving the sounding announcement frame 302-1, the STA 104-1 sends a sounding frame 304-1 to the AP 102. The AP 102 obtains, based on training signals included in the sounding frame 304-1, a channel estimate characterizing the communication channel from the STA 104-1 to the AP 102. Furthermore, based on the channel estimate characterizing the communication channel from the STA 104-1 to the AP 102, the AP 102 generates beamforming feedback information for the STA 104-1. During a time interval 326-1, the AP 102 transmits a feedback frame 306-1 to the STA 104-1 that includes the beamforming feedback information for the STA 104-1. The STA 104-1 uses the received beamforming feedback frame 306-1 to generate its transmit beamforming matrices for UL MU-MIMO transmission.

The AP 102 may sequentially prompt other STAs (e.g., 104-2 and 104-3) to transmit sounding frames, obtain a channel estimate characterizing the communication channel from each of other STAs to the AP 102, and transmit beamforming feedback to each of other STAs. For example, during a time interval 322-2, the AP 102 sends a sounding announcement frame 302-2 to the STA 104-2. During a time interval 324-2, in response to receiving the sounding announcement frame 302-2, the STA 104-2 sends a sounding frame 304-2 to the AP 102. The AP 102 obtains, based on training signals included in the sounding frame 304-2, a channel estimate characterizing the communication channel from the STA 104-2 to the AP 102 and further generates beamforming feedback information for the STA 104-2. During a time interval 326-2, the AP 102 transmits a feedback frame 306-2 to the STA 104-2, which includes the beamforming feedback information for the STA 104-2. The STA 104-2 uses the received beamforming feedback frame 306-2 to generate its transmit beamforming matrices for UL MU-MIMO transmission. The same sounding procedure is performed between the AP 102 and the STA 104-3 in the following time intervals 322-3, 324-3 and 326-3.

During a time interval 328 in FIG. 3, based on the received sounding frames 304 (e.g., 304-1, 304-2 and 304-3) from the STAs 104, the AP 102 selects a subset of STAs for inclusion into an UL group for UL MU-MIMO transmission (e.g., the STAs 104-1 and 104-2 in this example). During a time interval 332, the AP 102 transmits a trigger frame 308 to each of the STAs in the UL group (e.g., the STAs 104-1 and 104-2 in this example) for UL MU-MIMO transmission. The trigger frame 308 prompts the STAs in the UL group to simultaneously transmit data streams to the AP 102 at a particular time interval. During a time interval 334, the STAs in the UL group (i.e., STAs 104-1 and 104-2 in this example) transmit respective data stream 310 simultaneously to the AP 102 using respective transmit beamforming matrices.

According to the prior art, for UL MU-MIMO transmission, the transmit beamforming matrices used by a particular STA are obtained based on the channel estimate for the particular STA, not taking into account channel estimates of other STAs that belong to the same UL group as the particular STA. Therefore, the transmit beamforming matrices may not be instrumental for mitigating multiuser interference in UL MU-MIMO transmission. As a result, even if an advanced receiver is used by the AP 102, it may not be able to suppress multiuser interference in UL MU-MIMO transmission sufficiently and thus the total throughput for UL MU-MIMO transmission may be compromised. In addition, the prior art as illustrated in FIG. 3 cannot handle subband based UL OFDMA transmission efficiently. The present disclosure is made in light of the foregoing knowledge. The present disclosure is made in light of the foregoing knowledge.

Next, various embodiments for the sounding procedure and the corresponding UL MU transmission of the present disclosure will be explained in further details.

First Embodiment

Figure 4:
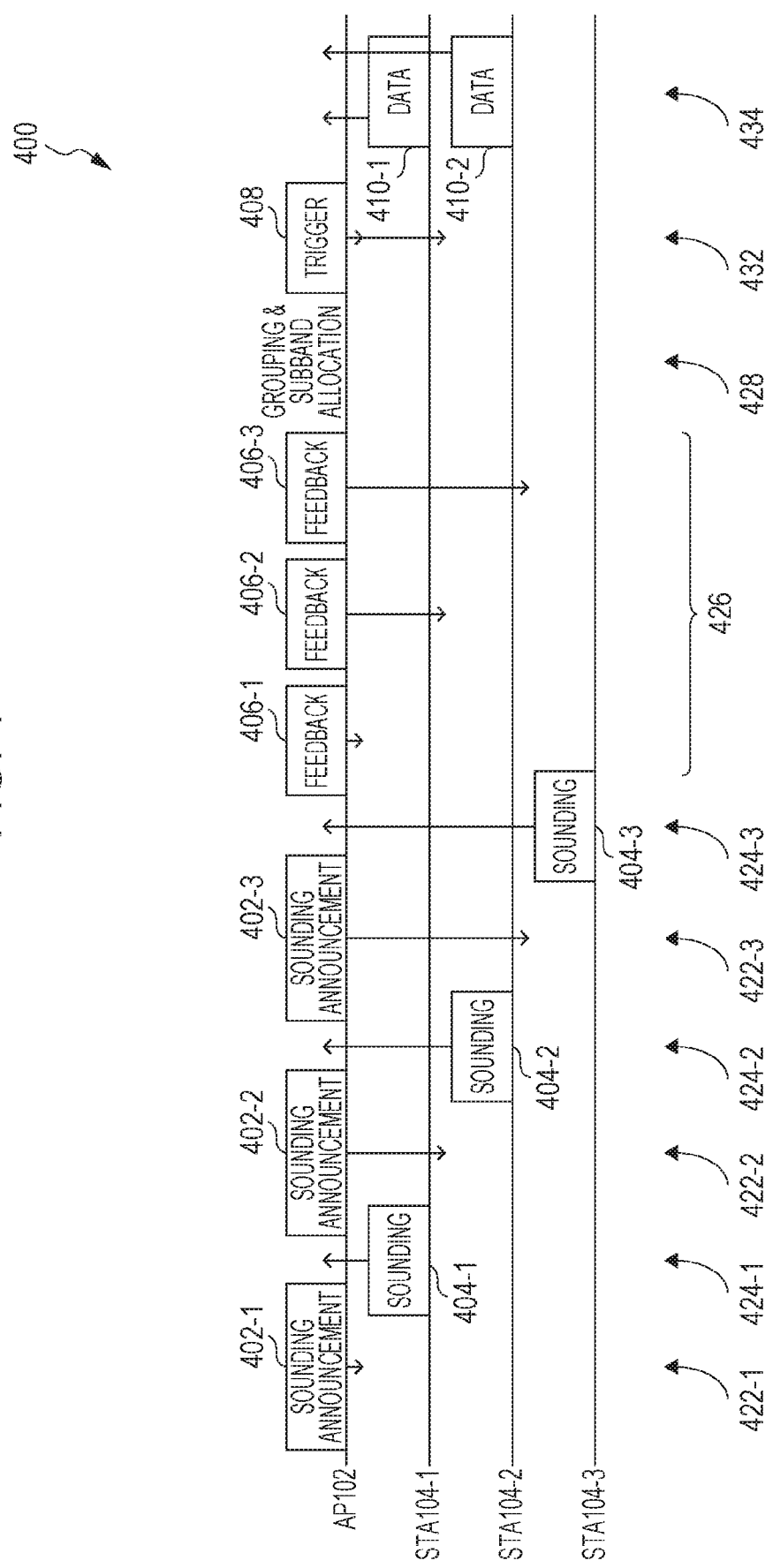
FIG. 4 shows a schematic timing diagram illustrating an example sounding procedure and an example UL MU transmission based on the example sounding procedure, according to a first embodiment of the present disclosure.

FIG. 4 is a schematic timing diagram illustrating an example sounding procedure 400 and an example UL MU transmission based on the sounding procedure 400, according to a first embodiment of the present disclosure. The sounding procedure 400 is an explicit sounding procedure in which the AP 102 derives channel state information and/or quality indicators corresponding to a communication channel from a STA to the AP 102, directly from a sounding frame transmitted by the STA to the AP 102.

During a time interval 422-1, the AP 102 transmits a sounding announcement frame 402-1 to the STA 104-1 to initiate the sounding procedure 400 and to request the STA 104-1 to transmit a sounding frame. During a time interval 424-1, in response to receiving the sounding announcement frame 402-1, the STA 104-1 sends a sounding frame 404-1 to the AP 102. The sounding frame 404-1 includes suitable training signals in the PHY (Physical Layer) preamble (e.g., the HE-LTF field) to allow the AP 102 to obtain a channel state information and/or quality indicators of the communication channel from the STA 104-1 to the AP 102. The sounding frame 404-1 may also include UL power control information for the STA 104-1 (e.g., transmit power, power adjustable range and/or power headroom) in the PHY preamble (e.g., HE-SIG-A field). The sounding frame may be a NDP (Null Data Packet) that includes a PHY preamble only and omits a payload. The AP 102 obtains, based on training signals included in the sounding frame 404-1, channel state information (e.g., gain, phase, SNR (Signal to Noise Ratio), etc.) corresponding to the entire bandwidth of the communication channel from the STA 104-1 to the AP 102. Additionally or alternatively, the AP 102 determines quality indicators (e.g., SNR, SNIR (Signal to Noise plus Interference Ratio), signal strength, etc.) corresponding to one or more subbands of the communication channel from the STA 104-1 to the AP 102. Based on quality indicators corresponding to the one or more subbands of the communication channel from the STA 104-1 to the AP 102, the AP 102 further identifies one or more candidate subbands for the STA 104-1 to be used for UL transmission.

The AP 102 may sequentially prompt other STAs (e.g., 104-2 and 104-3) to transmit sounding frames. Based on training signals included in the sounding frames, the AP 102 obtains channel state information corresponding to the entire bandwidth of the communication channel from each of other STAs to the AP 102 and/or quality indicators corresponding to one or more subbands of the communication channel from each of other STAs to the AP 102. Based on the quality indicators corresponding to the one or more subbands of the communication channel from each of other STAs to the AP 102, the AP 102 determines one or more candidate subbands for each of other STAs to the AP 102. For example, during a time interval 422-2, the AP 102 sends a sounding announcement frame 402-2 to the STA 104-2. During a time interval 424-2, in response to receiving the sounding announcement frame 402-2, the STA 104-2 sends a sounding frame 404-2 to the AP 102. The AP 102 obtains channel state information corresponding to the entire bandwidth of the communication channel from the STA 104-2 to the AP 102. Additionally or alternatively, the AP 102 determines quality indicators corresponding to one or more subbands of the communication channel from the STA 104-2 to the AP 102. The AP 102 further identifies one or more candidate subbands for the STA 104-2 to be used for UL transmission. The same sounding procedure is performed between the AP 102 and the STA 104-3 in the following time intervals 422-3 and 424-3.

According to the first embodiment of the present disclosure, the AP 102 identifies intended usage of transmission scheme for the entire bandwidth and/or each of the one or more candidate subbands for each of the STAs based on the channel state information corresponding to the entire bandwidth of the communication channel from each of the STAs to the AP 102 and/or quality indicators corresponding to the one or more candidate subbands of the communication channel from each of the STAs to the AP 102. For example, the AP 102 determines whether the entire bandwidth or each of the one or more candidate subbands for each of the STAs should be used for UL SU-MIMO transmission, UL MU-MIMO transmission or both.

According to the first embodiment of the present disclosure, in case that the AP 102 expects that only a single STA will have buffered data to be transmitted over the entire bandwidth (e.g., only a single STA has indicated to the AP 102 that it has a large amount of buffered data to be transmitted), the AP 102 may determine the entire bandwidth should be used only for UL SU-MIMO transmission.

According to the first embodiment of the present disclosure, in case that the AP 102 expects that two or more STAs will have buffered data to be transmitted over the entire bandwidth (e.g., the two or more STAs have indicated to the AP 102 that they have a large amount of buffered data to be transmitted), the AP 102 may determine the entire bandwidth should be used only for UL MU-MIMO transmission.

According to the first embodiment of the present disclosure, in case that the AP 102 is uncertain about how the entire bandwidth is used for the time being, the AP 102 may determine the entire bandwidth should be used for UL SU-MIMO or UL MU-MIMO transmission.

According to the first embodiment of the present disclosure, in case that a candidate subband is owned by a single STA, the AP 102 may determine the candidate subband should be used only for UL SU-MIMO transmission.

According to the first embodiment of the present disclosure, in case that a candidate subband is shared by two or more STAs and but the AP 102 expects that only one of the two or more STAs will have buffered data to be transmitted over the candidate subband (e.g., only one of the two or more STAs has indicated to the AP 102 that it has buffered data to be transmitted), the AP 102 may determine the candidate subband should be used only for UL SU-MIMO transmission.

According to the first embodiment of the present disclosure, in case that a candidate subband is shared by two or more STAs and the AP 102 expects that the two or more STAs will have buffered data to be transmitted over the candidate subband (e.g., the two or more STAs have indicated to the AP 102 that they have buffered data to be transmitted), the AP 102 may determine the candidate subband should be used only for UL MU-MIMO transmission.

According to the first embodiment of the present disclosure, in case that a candidate subband is shared by two or more STAs and however the AP 102 is uncertain about how the candidate subband is used for the time being, the AP 102 may determine the candidate subband should be used for UL SU-MIMO or UL MU-MIMO transmission.

According to the first embodiment of the present disclosure, if the AP 102 determines the entire bandwidth or a candidate subband should be used only for UL SU-MIMO transmission by a STA, the AP 102 develops the transmit beamforming matrices for the STA specific to UL SU-MIMO transmission over the entire bandwidth or the candidate subband. For example, assume Hk represents the channel matrix of the communication channel from the STA to the AP 102 for the k-th tone (subcarrier). Then the transmit beamforming matrix Qk specific to UL SU-MIMO transmission for the k-th tone can be given by Qk=Vk, where Vk can be obtained via singular value decomposition (SVD) of the channel matrix Hk.

According to the first embodiment of the present disclosure, if the AP 102 determines the entire bandwidth or a candidate subband should be used only for UL MU-MIMO transmission by a group of STAs, the AP 102 develops the transmit beamforming matrices for each STA in the group specific to UL MU-MIMO transmission over the entire bandwidth or the candidate subband. For example, assume a group of N STAs engage in UL MU-MIMO transmission over the entire bandwidth or the candidate subband, and Hk,i represents the channel matrix over the entire bandwidth or the candidate subband for the i-th STA in the group and the k-th tone. Then the transmit beamforming matrices {Qk,i, i=1, 2 . . . , N} specific to UL MU-MIMO transmission for the k-th tone can be chosen in such a way that $$(H_{k,i}Q_{k,i})^H(H_{k,j}Q_{k,j})=0$$

where i≠j and I, j=1, 2 . . . , N. Consequently, multiuser interference in UL MU-MIMO transmission is suppressed and a simpler receiver can be used by the AP 102 to receive UL MU-MIMO transmission. As for the example methods for determining the transmit beamforming matrices {Qk,i, i=1, 2 . . . , N} satisfying formula (1), please refer to [Transmit Beamforming and Detection Design for Uplink Multiuser MIMO System, Proceedings of Fortieth Asilomar Conference on Signals, Systems and Computers, 2006 (AC-SSC '06), Page 1593-1600].

According to the first embodiment of the present disclosure, if the AP 102 determines the entire bandwidth or a candidate subband should be used for UL SU-MIMO transmission by a STA or UL MU-MIMO transmission by a group of STAs, the AP 102 develops both the transmit beamforming matrices for the STA specific to UL SU-MIMO transmission and the transmit beamforming matrices for each STA in the group specific to UL MU-MIMO transmission over the entire bandwidth or the candidate subband.

During a time interval 426, the AP 102 transmits a feedback frame 406-1 to the STA 104-1. After that, the AP 102 may sequentially transmit feedback frames 406-2 and 406-3 to other STAs 104-2 and 104-3, respectively. For example, the AP 102 sends a feedback frame 406-2 to the STA 104-2. The STAs 104 obtain respective transmit beamforming matrices directly from the data of the respective feedback frames 406 for UL MU transmission, According to the first embodiment of the present disclosure, the feedback frame 406 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; (vi) one or more quality indicators corresponding to the entire bandwidth for the particular STA; (vii) beamforming feedback information corresponding to the entire bandwidth for the particular STA; and (viii) UL power control information (e.g. required power adjustment amount), etc.

According to the first embodiment of the present disclosure, what is included in the beamforming feedback information corresponding to the entire bandwidth or a candidate subband for a particular STA depends on the intended usage of transmission scheme for the entire bandwidth or the candidate subband for the particular STA. If the entire bandwidth or a candidate subband should be used only for UL SU-MIMO transmission, the beamforming feedback information corresponding to the entire bandwidth or the candidate subband shall represent the transmit beamforming matrices specific to UL SU-MIMO transmission. If the entire bandwidth or a candidate subband should be used only for UL MU-MIMO transmission, the beamforming feedback information corresponding to the entire bandwidth or the candidate subband shall represent the transmit beamforming matrices specific to UL MU-MIMO transmission. If the entire bandwidth or a candidate subband should be used for UL SU-MIMO or UL MU-MIMO transmission, the beamforming feedback information corresponding to the entire bandwidth or the candidate subband shall represent both the transmit beamforming matrices specific to UL SU-MIMO transmission and the transmit beamforming matrices specific to UL MU-MIMO transmission.

According to the first embodiment of the present disclosure, if a first STA (e.g., the STA 104-1) and a second STA (e.g., the STA 104-2) engage in UL MU-MIMO transmission over the entire bandwidth or a particular subband, the transmit beamforming matrices specific to UL MU-MIMO transmission over the entire bandwidth or the particular subband which is represented in the feedback frame for the first STA (e.g., the feedback frame 406-1 for the STA 104-1) are developed based. The transmit beamforming matrices specific to UL MU-MIMO transmission are developed on not only the sounding frame transmitted by the first STA (e.g., the sounding frame 404-1 transmitted by the STA 104-1) but also the sounding frame transmitted by the second STA (e.g., the sounding frame 404-2 transmitted by the STA 104-2). In other words, the transmit beamforming matrices specific to UL MU-MIMO transmission represented in the feedback frame for the first STA (e.g., the feedback frame 406-1 for the STA 104-1) vary when the channel state between the AP 102 and the second STA (e.g., the STA 104-2) has changed, even if the channel state between the AP 102 and the first STA (e.g., the STA 104-1) has not changed.

Figure 5:
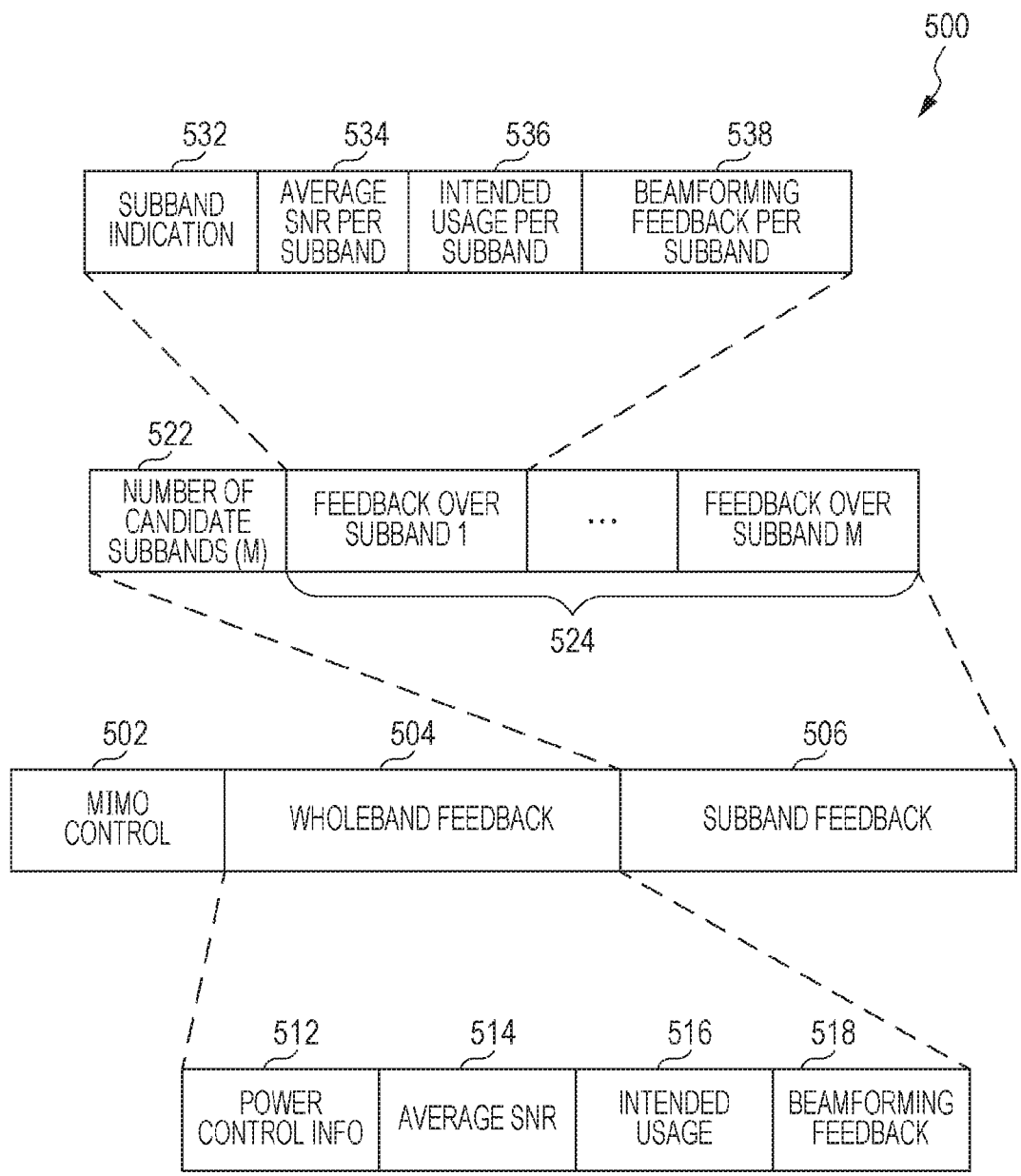
FIG. 5 shows a diagram illustrating an example feedback frame according to the first embodiment of the present disclosure.

FIG. 5 is a diagram illustrating an example feedback frame 500 that the AP 102 is configured to transmit to a STA during the sounding procedure 400 of FIG. 4. The feedback frame 500 corresponds to each of the feedback frames 406-1, 406-2 and 406-3 of FIG. 4. The feedback frame 500 includes a MIMO control field 502, a wholeband feedback portion 504 and a subband feedback portion 506.

The wholeband feedback portion 504 includes a power control information field 512, an average SNR field 514, an intended usage field 516 and a beamforming feedback field 518. The wholeband feedback portion 504 includes feedback that covers the entire bandwidth of the communication channel. Alternatively, the wholeband feedback portion 504 includes feedback that covers the bandwidth of the sounding frame based on which the feedback was generated by the AP 102. The beamforming feedback field 518 includes some form of beamforming feedback over the entire bandwidth for a particular STA generated by the AP 102 based on a sounding frame transmitted by the particular STA. As abovementioned, the beamforming feedback over the entire bandwidth depends on the transmission scheme intended to be used for the entire bandwidth. The beamforming feedback field 518 includes compressed beamforming feedback similar to what is defined in the IEEE 802.11ac standard. Alternatively, the beamforming feedback field 518 includes another suitable form of beamforming feedback, such as uncompressed beamforming feedback similar to what is defined in the IEEE 802.11n standard.

The subband feedback portion 506 includes a number of candidate subbands field 522 and a plurality of subband based feedback fields 524, each of which corresponds to a specific candidate subband. Each of the subband based feedback fields 524 includes a subband indication field 532, an average SNR per subband field 534, an intended usage per subband field 536 and a beamforming feedback per subband field 538. The subband indication field 532 indicates a particular subband. The beamforming feedback per subband field 538 includes some form of beamforming feedback over the particular subband for a particular STA generated by the AP 102 based on a sounding frame transmitted by the particular STA. As abovementioned, the beamforming feedback over a particular subband depends on the transmission scheme intended to be used for the particular subband as specified in the corresponding intended usage per subband field 536. The beamforming feedback per subband field 538 includes compressed beamforming feedback similar to what is defined in the IEEE 802.11ac standard. Alternatively, the beamforming feedback per subband field 516 includes another suitable form of beamforming feedback, such as uncompressed beamforming feedback similar to what is defined in the IEEE 802.11n standard.

During a time interval 428 in FIG. 4, based on the channel state information corresponding to the entire bandwidth, the quality indicators corresponding to the one or more subbands of the communication channel and/or data buffer status obtained for at least some of the STAs 104, the AP 102 selects a subset of STAs for inclusion into an UL group (e.g., STAs 104-1 and 104-2 in this example) for UL MU transmission. The AP 102 shall also designate respective transmission schemes and allocate respective transmission resources (e.g., subbands in terms of UL OFDMA) to the STAs in the UL group.

For one example, in case that two or more STAs have indicated to the AP 102 that they have a large amount of buffered data to be transmitted and quality of the communication channel for each of the two or more STAs is acceptable (e.g., SNR corresponding to the entire bandwidth exceeds to a predetermined threshold), the AP 102 may select the two or more STAs for inclusion into an UL group and schedule the two or more STAs in the UL group to perform UL MU-MIMO transmission over the entire bandwidth.

For another example, in case that two or more STAs have indicated to the AP 102 that they have buffered data to be transmitted and quality corresponding to one or more candidate subbands for each of the two or more STAs is acceptable (e.g., SINR corresponding to the candidate subband exceeds to a predetermined threshold), the AP 102 may select the two or more STAs for inclusion into an UL group. Then, the AP 102 may allocate respective subbands to the two or more STAs in the UL group and schedule the two or more STAs in the UL group to perform UL SU-MIMO transmission over their respective allocated subbands.

According to the first embodiment of the present disclosure, the timing order of feedback transmission (time intervals 426) and grouping and subband allocation (time interval 428) in FIG. 4 may be interchangeable. For example, during a time interval 426, the AP 102 may select a subset of STAs for inclusion into an UL group, designate respective transmission schemes and allocate respective transmission resources to each of the STAs in the UL group first. Then during a time interval 428, the AP 102 proceeds to transmitting respective feedback frames 406 to the STAs 104 in the UL group.

During a time interval 432, the AP 102 transmits a trigger frame 408 to the STAs included in the UL group (e.g., STAs 104-1 and 104-2 in this example) for UL MU transmission. The trigger frame 408 prompts the STAs in the UL group to simultaneously transmit data to the AP 102 at a particular time interval. The trigger frame 408 also includes information on the designated transmission scheme and/or the allocated transmission resource for each of the STAs in the UL group.

During a time interval 434, if the trigger frame 408 triggers an UL MU-MIMO transmission, the STAs in the UL group (e.g., STAs 104-1 and 104-2 in this example) transmit respective data 410 simultaneously over the entire bandwidth to the AP 102 using respective transmit beamforming matrices specific to UL MU-MIMO transmission over the entire bandwidth. If the trigger frame 408 triggers an UL OFDMA transmission, the STAs in the UL group transmit respective data 410 simultaneously to the AP 102 over respective allocated subbands using respective transmit beamforming matrices. These transmit beamforming matrices can be generated from respective feedback frames 406 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 406-1.

Second Embodiment

Figure 6:
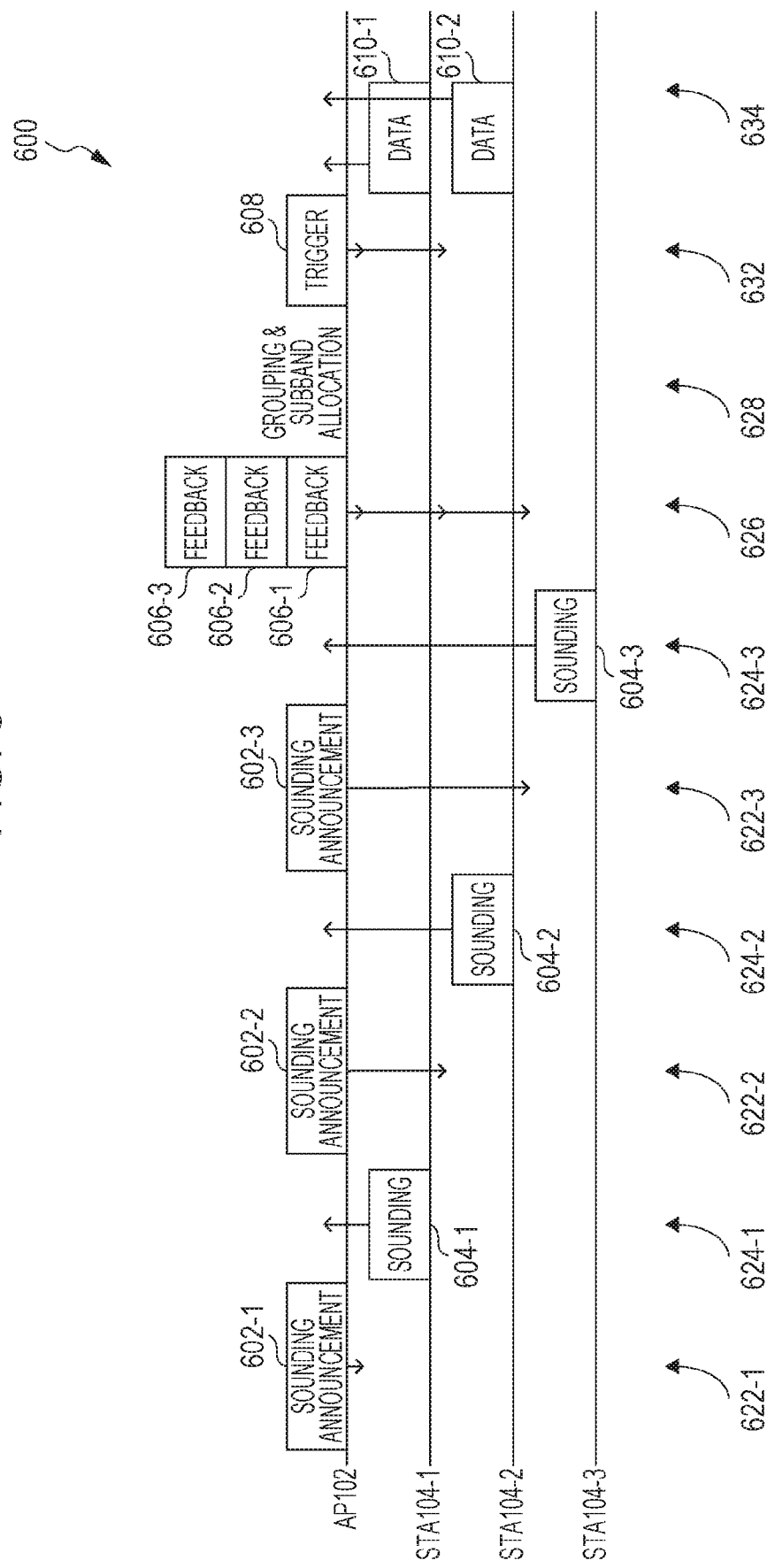
FIG. 6 shows a schematic timing diagram illustrating an example sounding procedure and an example UL MU transmission based on the example sounding procedure, according to a second embodiment of the present disclosure.

FIG. 6 is a schematic timing diagram illustrating an example sounding procedure 600 and an example UL MU transmission based on the sounding procedure 600, according to a second embodiment of the present disclosure. Similar to the sounding procedure 400 in FIG. 4, the sounding procedure 600 is also an explicit sounding procedure.

During a time interval 622-1, the AP 102 transmits a sounding announcement frame 602-1 to the STA 104-1 to initiate the sounding procedure 600 and request the STA 104-1 to transmit a sounding frame. During a time interval 624-1, in response to receiving the sounding announcement frame 602-1, the STA 104-1 sends a sounding frame 604-1 to the AP 102. The sounding frame 604-1 includes suitable training signals in the PHY preamble (e.g., HE-LTF field). The sounding frame 604-1 may also include UL power control information for the STA 104-1 (e.g., transmit power, power adjustable range and/or power headroom) in the PHY preamble (e.g., HE-SIG-A field). The sounding frame 604-1 may be a NDP. The AP 102 obtains, based on training signals included in the sounding frame 604-1, channel state information (e.g., gain, phase, SNR, etc.) corresponding to the entire bandwidth of the communication channel from the STA 104-1 to the AP 102. Additionally or alternatively, the AP 102 determines quality indicators (e.g., SNR, SNIR, signal strength, etc.) corresponding to one or more subbands of the communication channel from the STA 104-1 to the AP 102. The AP 102 further identifies one or more candidate subbands for the STA 104-1 to be used for UL transmission.

The AP 102 may sequentially prompt other STAs 104 to transmit respective sounding frames. Based on the received sounding frames, the AP 102 obtains channel state information corresponding to the entire bandwidth of the communication channel from each of other STAs 104 to the AP 102 and/or quality indicators corresponding to one or more subbands of the communication channel from each of other STAs 104 to the AP 102. The AP 102 further identifies one or more candidate subbands for each of the other STAs 104. For example, during a time interval 622-2, the AP 102 sends a sounding announcement frame 602-2 to the STA 104-2. During a time interval 624-2, in response to receiving the sounding announcement frame 602-2, the STA 104-2 sends a sounding frame 604-2 to the AP 102. The AP 102 obtains channel state information corresponding to the entire bandwidth of the communication channel from the STA 104-2 to the AP 102. Additionally or alternatively, the AP 102 determines quality indicators corresponding to each of the one or more subbands of the communication channel from the STA 104-2 to the AP 102. Furthermore, the AP 102 identifies one or more candidate subbands for the STA 104-2 to be used for UL transmission.

According to the second embodiment of the present disclosure, the AP 102 identifies intended usage of transmission scheme for the entire bandwidth and/or each of the one or more candidate subbands for each of the STAs 104 based on channel state information corresponding to the entire bandwidth of the communication channel from each of the STAs 104 to the AP 102 and/or quality indicators corresponding to the one or more candidate subbands of the communication channel from each of the STAs 104 to the AP 102. For example, the AP 102 determines whether the entire bandwidth or each of the one or more candidate subbands for each of the STA 104 should be used for UL SU-MIMO transmission, UL MU-MIMO transmission or both.

According to the second embodiment of the present disclosure, if the AP 102 determines the entire bandwidth or a candidate subband should be used only for UL SU-MIMO transmission by a STA, the AP 102 develops the transmit beamforming matrices for the STA specific to UL SU-MIMO transmission over the entire bandwidth or the candidate subband in a similar manner to the first embodiment, According to the second embodiment of the present disclosure, if the AP 102 determines the entire bandwidth or a candidate subband should be used only for UL MU-MIMO transmission by a group of STAs, the AP 102 develops the transmit beamforming matrices for each STA in the group specific to UL MU-MIMO transmission over the entire bandwidth or the candidate subband in a similar manner to the first embodiment.

According to the second embodiment of the present disclosure, if the AP 102 determines the entire bandwidth or a candidate subband should be used for UL SU-MIMO transmission by a STA or UL MU-MIMO transmission by a group of STAs, the AP 102 develops both the transmit beamforming matrices for the STA specific to UL SU-MIMO transmission and the transmit beamforming matrices for each STA in the group specific to UL MU-MIMO transmission over the entire bandwidth or the candidate subband.

During a time interval 626, the AP 102 transmits respective feedback frames 606 to the STAs 104 simultaneously in a DL MU PPDU by multiplexing the feedback frames with DL OFDMA or DL MU-MIMO. In this example, the AP 102 transmits the feedback frames 606-1, 606-2 and 606-3 to the STAs 104-1, 104-2 and 104-3, respectively, in a DL MU PPDU. Note that the transmit beamforming matrices to be used by the AP 102 for each of the STAs 104 in DL MU transmission shall be obtained in advance via a sounding procedure for DL MU transmission (see U.S. Patent Application No. 2015/0146807A1 for example). The STAs 104 obtains the respective transmit beamforming matrices directly from the data of the respective feedback frames 606 for UL MU transmission.

According to the second embodiment of the present disclosure, since the feedback frames 606 are transmitted by the AP 102 simultaneously to the STAs 104, channel efficiency is improved compared to the first embodiment where the feedback frames 406 are transmitted by the AP 102 sequentially to the STAs 104.

According to the second embodiment of the present disclosure, the feedback frame 606 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; (vi) one or more quality indicators corresponding to the entire bandwidth for the particular STA; (vii) beamforming feedback corresponding to the entire bandwidth for the particular STA; and (viii) power control information (e.g. required power adjustment amount), etc.

According to the second embodiment of the present disclosure, what is included in the beamforming feedback corresponding to the entire bandwidth or a candidate subband for a particular STA depends on the intended usage of transmission scheme for the entire bandwidth or the candidate subband for the particular STA. If the entire bandwidth or a candidate subband intends to be used only for UL SU-MIMO transmission, the beamforming feedback corresponding to the entire bandwidth or the candidate subband shall represent the transmit beamforming matrices specific to UL SU-MIMO transmission. If the entire bandwidth or a candidate subband intends to be used only for UL MU-MIMO transmission, the beamforming feedback corresponding to the entire bandwidth or the candidate subband shall represent the transmit beamforming matrices specific to UL MU-MIMO transmission. If the entire bandwidth or a candidate subband intends to be used for UL SU-MIMO or UL MU-MIMO transmission, the beamforming feedback corresponding to the entire bandwidth or the candidate subband shall represent both the transmit beamforming matrices specific to UL SU-MIMO transmission and the transmit beamforming matrices specific to UL MU-MIMO transmission.

During a time interval 628, based on channel state information corresponding to the entire bandwidth, quality indicators corresponding to the one or more subbands of the communication channel and/or data buffer status obtained for at least some of the STAs 104, the AP 102 selects a subset of STAs for inclusion into an UL group for UL MU transmission. The AP 102 shall also designate respective transmission schemes and allocate respective transmission resources (e.g., subbands in terms of UL OFDMA) to the STAs in the UL group.

According to the second embodiment of the present disclosure, the timing order of feedback transmission (time intervals 626) and grouping and subband allocation (time interval 628) in FIG. 6 may be interchangeable. For example, during a time interval 626, the AP 102 may select STAs inclusion into an UL group, designate respective transmission schemes and allocate respective transmission resources to the STAs in the UL group first. Then during a time interval 628, the AP 102 proceeds to transmitting respective feedback frames 606 to the STAs 104 in the UL group.

During a time interval 632, the AP 102 transmits a trigger frame 608 to the STAs in the UL group (e.g., STAs 104-1 and 104-2 in this example) for UL MU transmission. The trigger frame 608 prompts the STAs in the UL group to simultaneously transmit data to the AP 102 at a particular time. The trigger frame 608 also includes information on the designated transmission scheme and/or the allocated transmission resource for each of the STAs in the UL group.

During a time interval 634, if the trigger frame 608 triggers an UL MU-MIMO transmission, the STAs in the UL group (i.e., STAs 104-1 and 104-2 in this example) transmit respective data 610 simultaneously over the entire bandwidth to the AP 102 using respective transmit beamforming matrices specific to UL MU-MIMO transmission over the entire bandwidth. If the trigger frame 608 triggers an UL OFDMA transmission, the STAs in the UL group transmit respective data 610 simultaneously to the AP 102 over respective allocated subbands using respective transmit beamforming matrices which can be generated from respective feedback frames 606 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 606-1.

Third Embodiment

Figure 7:
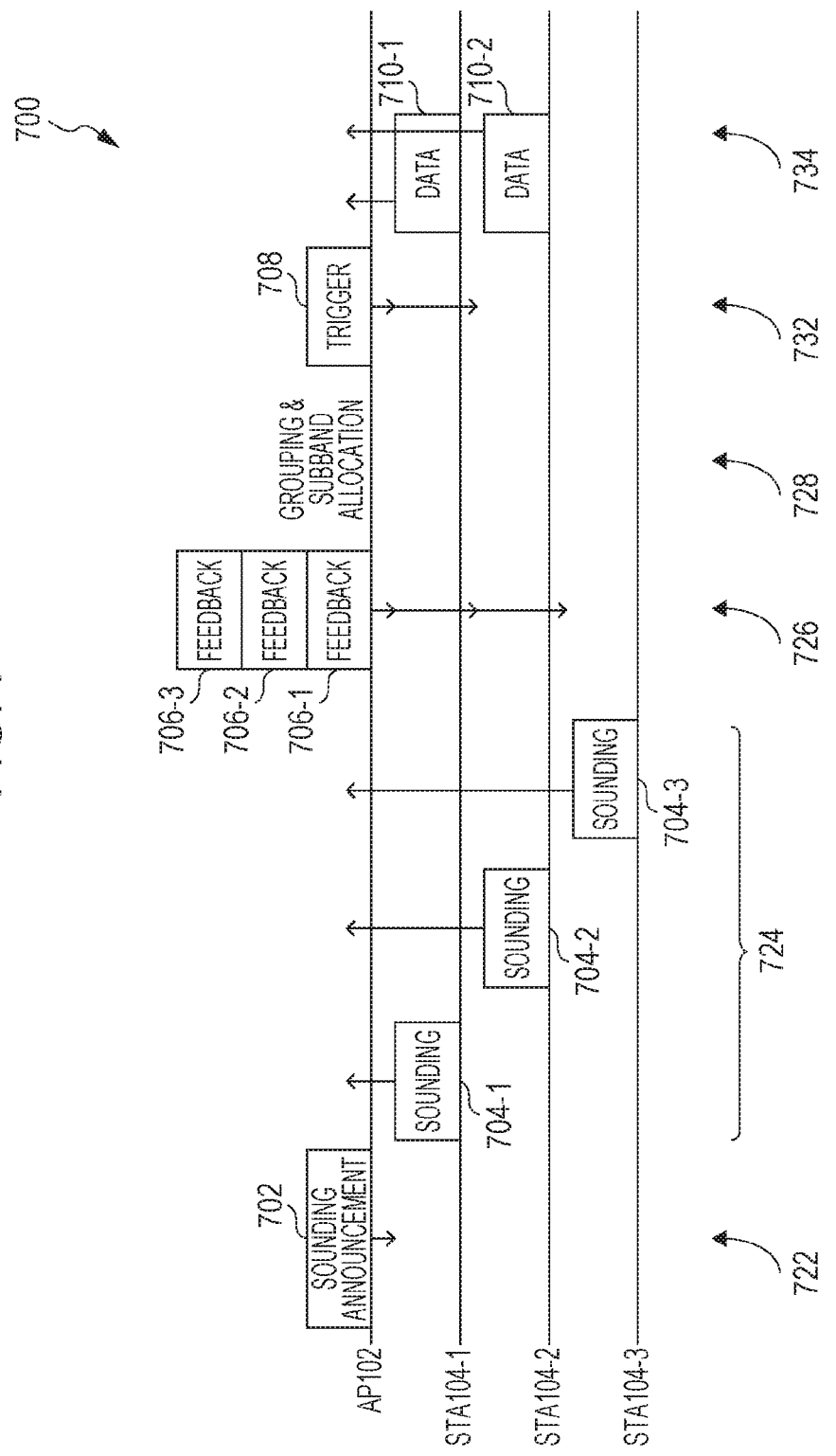
FIG. 7 shows a schematic timing diagram illustrating an example sounding procedure and an example UL MU transmission based on the example sounding procedure, according to a third embodiment of the present disclosure.

FIG. 7 is a schematic timing diagram illustrating an example sounding procedure 700 and an example UL MU transmission based on the sounding procedure 700, according to a third embodiment of the present disclosure. Similar to the sounding procedure 400 in FIG. 4, the sounding procedure 700 is also an explicit sounding procedure.

During a time interval 722, the AP 102 transmits a sounding announcement frame 702 to the STAs 104 to initiate the sounding procedure 700. In other words, a single sounding announcement frame 702 is multicasted to all the STAs 104. The sounding announcement frame 702 contains information to coordinate the timing when the STAs 104 transmit respective sounding frames. For example, payload of the sounding announcement frame 702 can indicate an ordering of the STAs 104 that are requested to transmit sounding frames.

According to the third embodiment of the present disclosure, since the sounding announcement frame 702 is multicasted to the STAs 104, channel efficiency is improved compared to the second embodiment where the sounding announcement frames 602 are transmitted by the AP 102 individually to the STAs 104.

During a time interval 724, in response to receiving the sounding announcement frame 702, the STAs 104 sequentially transmit respective sounding frames 704 to the AP 102 according to the timing information included in the sounding announcement frame 702. In this example, the STA 104-1 sends a sounding frame 704-1 to the AP 102, followed by the STA 104-2 and the STA 104-3. Each of the sounding frames 704 includes suitable training signals in the PHY preamble (e.g., HE-LTF field). Each of the sounding frames 704 may also include UL power control information for the STA 104 transmitting the sounding frame (e.g., transmit power, power adjustable range and/or power headroom) in the PHY preamble (e.g., HE-SIG-A field). Each of the sounding frames 704 may be a NDP. The AP 102 obtains, based on training signals included in each of the sounding frames 704, channel state information (e.g., gain, phase, SNR, etc.) corresponding to the entire bandwidth of the communication channel from each of the STAs 104 to the AP 102. Additionally or alternatively, the AP 102 determines quality indicators (e.g., SNR, SNIR, signal strength, etc.) corresponding to each of one or more subbands of the communication channel from each of the STAs 104 to the AP 102. The AP 102 further identifies one or more candidate subbands for each of the STAs 104 to be used for UL transmission.

According to the third embodiment of the present disclosure, based on the channel state information corresponding to the entire bandwidth of the communication channel from each of the STAs 104 to the AP 102 and/or quality indicators corresponding to the one or more candidate subbands of the communication channel from each of the STAs 104 to the AP 102, the AP 102 identifies intended usage of transmission scheme for the entire bandwidth and/or each of the one or more candidate subbands for each of the STAs 104. For example, the AP 102 determines whether the entire bandwidth or each of the one or more candidate subbands for each of the STA 104 should be used for UL SU-MIMO transmission, UL MU-MIMO transmission or both.

According to the third embodiment of the present disclosure, if the AP 102 determines the entire bandwidth or a candidate subband should be used only for UL SU-MIMO transmission by a STA, the AP 102 develops the transmit beamforming matrices for the STA specific to UL SU-MIMO transmission over the entire bandwidth or the candidate subband in a similar manner to the first embodiment.

According to the third embodiment of the present disclosure, if the AP 102 determines the entire bandwidth or a candidate subband should be used only for UL MU-MIMO transmission by a group of STAs, the AP 102 develops the transmit beamforming matrices for each STA in the UL group specific to UL MU-MIMO transmission over the entire bandwidth or the candidate subband in a similar manner to the first embodiment.

According to the third embodiment of the present disclosure, if the AP 102 determines the entire bandwidth or a candidate subband should be used for UL SU-MIMO transmission by a STA or UL MU-MIMO transmission by a group of STAs, the AP 102 develops both the transmit beamforming matrices specific to UL SU-MIMO transmission for the STA and the transmit beamforming matrices specific to UL MU-MIMO transmission for each STA in the group over the entire bandwidth or the candidate subband.

During a time interval 726, the AP 102 transmits respective feedback frames 706 to the STAs 104 simultaneously in a DL MU PPDU. In this example, the AP 102 transmits the feedback frames 706-1, 706-2 and 706-3 to the STAs 104-1, 104-2 and 104-3, respectively, in a DL MU PPDU. Note that the transmit beamforming matrices to be used by the AP 102 for each of the STAs 104 in DL MU transmission shall be obtained in advance via a sounding procedure for DL MU transmission. The STAs 104 obtains the respective transmit beamforming matrices directly from the data of the respective feedback frames 706 for UL MU transmission.

According to the third embodiment of the present disclosure, the feedback frame 706 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; (vi) one or more quality indicators corresponding to the entire bandwidth for the particular STA; (vii) beamforming feedback corresponding to the entire bandwidth for the particular STA; and (viii) power control information (e.g. required power adjustment amount), etc.

According to the third embodiment of the present disclosure, what is included in the beamforming feedback corresponding to the entire bandwidth or a candidate subband for a particular STA depends on the intended usage of transmission scheme for the entire bandwidth or the candidate subband for the particular STA. If the entire bandwidth or a candidate subband intends to be used only for UL SU-MIMO transmission, the beamforming feedback corresponding to the entire bandwidth or the candidate subband shall represent the transmit beamforming matrices specific to UL SU-MIMO transmission. If the entire bandwidth or a candidate subband should be used only for UL MU-MIMO transmission, the beamforming feedback corresponding to the entire bandwidth or the candidate subband shall represent the transmit beamforming matrices specific to UL MU-MIMO transmission. If the entire bandwidth or a candidate subband should be used for UL SU-MIMO or UL MU-MIMO transmission, the beamforming feedback corresponding to the entire bandwidth or the candidate subband shall represent both the transmit beamforming matrices specific to UL SU-MIMO transmission and the transmit beamforming matrices specific to UL MU-MIMO transmission.

During a time interval 728, the AP 102 selects STAs for inclusion into an UL group for UL MU transmission based on the channel state information corresponding to the entire bandwidth and/or quality indicators corresponding to the one or more subbands of the communication channel obtained for at least some of the STAs 104. The AP 102 shall also designate respective transmission schemes and allocate respective transmission resources (e.g., subbands in terms of UL OFDMA) to the STAs in the UL group.

According to the third embodiment of the present disclosure, the timing order of feedback transmission (time intervals 726) and grouping and subband allocation (time interval 728) in FIG. 7 may be interchangeable. For example, during a time interval 726, the AP 102 may select STAs inclusion into an UL group, designate respective transmission schemes and allocate respective transmission resources to the STAs in the UL group first. Then during a time interval 728, the AP 102 proceeds to transmit respective feedback frames 706 to the STAs 104.

During a time interval 732, the AP 102 transmits a trigger frame 708 to the STAs in the UL group (e.g., STAs 104-1 and 104-2 in this example) for UL MU transmission. The trigger frame 708 prompts the STAs in the UL group to simultaneously transmit data to the AP 102 at a particular time. The trigger frame 708 also includes information on the designated transmission scheme and/or the allocated transmission resource for each of the STAs in the UL group.

During a time interval 734, if the trigger frame 708 triggers an UL MU-MIMO transmission, the STAs in the UL group (i.e., STAs 104-1 and 104-2 in this example) transmit respective data 710 simultaneously over the entire bandwidth to the AP 102 using respective transmit beamforming matrices specific to UL MU-MIMO transmission over the entire bandwidth. If the trigger frame 708 triggers an UL OFDMA transmission, the STAs in the UL group transmit respective data 710 simultaneously to the AP 102 over respective allocated subbands using respective transmit beamforming matrices which can be generated from respective feedback frames 706 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 706-1.

Fourth Embodiment

Figure 8:
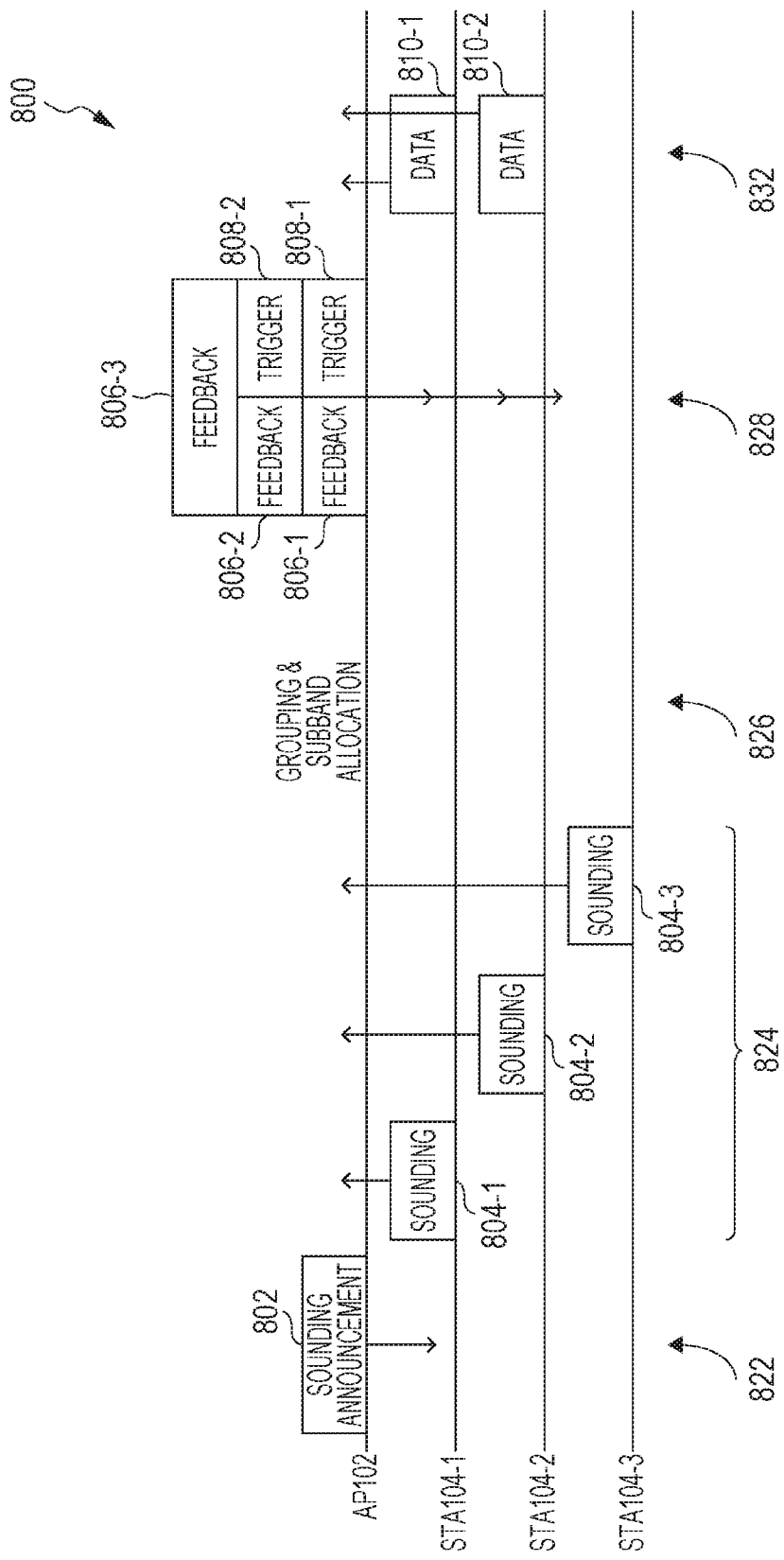
FIG. 8 shows a schematic timing diagram illustrating an example sounding procedure and an example UL MU transmission based on the example sounding procedure, according to a fourth embodiment of the present disclosure.

FIG. 8 is a schematic timing diagram illustrating an example sounding procedure 800 and an example UL MU transmission based on the sounding procedure 800, according to a fourth embodiment of the present disclosure. Similar to the sounding procedure 400 of FIG. 4, the sounding procedure 800 is also an explicit sounding procedure.

During a time interval 822, the AP 102 transmits a sounding announcement frame 802 to the STAs 104 to initiate the sounding procedure 800. The sounding announcement frame 802 contains information to coordinate the timing when the STAs 104 transmit respective sounding frames. For example, payload of the sounding announcement frame 802 can indicate an ordering of the STAs 104 that are requested to transmit sounding frames.

During a time interval 824, in response to receiving the sounding announcement frame 802, the STAs 104 sequentially transmit respective sounding frames 804 to the AP 102 according to the timing information included in the sounding announcement frame 802. In this example, the STA 104-1 sends a sounding frame 804-1 to the AP 102, followed by the STA 104-2 and the STA 104-3. Each of the sounding frames 804 includes suitable training signals in the PHY preamble (e.g., HE-LTF field). Each of the sounding frames 804 may also include UL power control information for the STA 104 transmitting the sounding frame (e.g., transmit power, power adjustable range and/or power headroom) in the PHY preamble (e.g., HE-SIG-A field). Each of the sounding frames 804 may be a NDP. The AP 102 obtains, based on training signals included in each of the sounding frames 804, channel state information (e.g., gain, phase, SNR, etc.) corresponding to the entire bandwidth of the communication channel from each of the STAs 104 to the AP 102. Additionally or alternatively, the AP 102 determines quality indicators (e.g., SNR, SNIR, signal strength, etc.) corresponding to each of one or more subbands of the communication channel from each of the STAs 104 to the AP 102. The AP 102 further identifies one or more candidate subbands for each of the STAs 104 to be used for UL transmission.

According to the fourth embodiment of the present disclosure, the AP 102 identifies intended usage of transmission scheme for the entire channel bandwidth and/or each of the one or more candidate subbands for each of the STAs 104 based on the channel state information corresponding to the entire bandwidth of the communication channel from each of the STAs 104 to the AP 102 and/or quality indicators corresponding to the one or more candidate subbands of the communication channel from each of the STAs 104 to the AP 102. For example, the AP 102 determines whether the entire bandwidth or each of the one or more candidate subbands for each of the STA 104 should be used for UL SU-MIMO transmission, UL MU-MIMO transmission or both.

According to the fourth embodiment of the present disclosure, if the AP 102 determines the entire bandwidth or a candidate subband should be used only for UL SU-MIMO transmission by a STA, the AP 102 develops the transmit beamforming matrices for the STA specific to UL SU-MIMO transmission over the entire bandwidth or the candidate subband in a similar manner to the first embodiment.

According to the fourth embodiment of the present disclosure, if the AP 102 determines the entire bandwidth or a candidate subband should be used only for UL MU-MIMO transmission by a group of STAs, the AP 102 develops the transmit beamforming matrices for each STA in the group specific to UL MU-MIMO transmission over the entire bandwidth or the candidate subband in a similar manner to the first embodiment.

According to the fourth embodiment of the present disclosure, if the AP 102 determines the entire bandwidth or a candidate subband should be used for UL SU-MIMO transmission by a STA or UL MU-MIMO transmission by a group of STAs, the AP 102 develops both the transmit beamforming matrices for the STA specific to UL SU-MIMO transmission and the transmit beamforming matrices for each STA in the group specific to UL MU-MIMO transmission over the entire bandwidth or the candidate subband.

During a time interval 826, the AP 102 selects STAs for inclusion into an UL group for UL MU transmission based on the channel state information corresponding to the entire bandwidth and/or quality indicators corresponding to the one or more subbands of the communication channel obtained for at least some of the STAs 104. The AP 102 shall also designate respective transmission schemes and allocate respective transmission resources (e.g., subbands in terms of UL OFDMA) to the STAs in the UL group.

During a time interval 828, the AP 102 transmits respective feedback frames 806 to the STAs 104 in the UL group simultaneously in a DL MU PPDU. The AP 102 also transmits respective trigger frames 808 to the STAs in the UL group (e.g., STAs 104-1 and 104-2 in this example) in the same DL MU PPDU. In this example, the AP 102 transmits an aggregation of the feedback frame 806-1 and the trigger frame 808-1, an aggregation of the feedback frame 806-2 and the trigger frame 808-2, and the feedback frame 806-3 to the STAs 104-1, 104-2 and 104-3, respectively, in a DL MU PPDU. Note that the transmit beamforming matrices to be used by the AP 102 for each of the STAs 104 in DL MU transmission shall be obtained in advance via a sounding procedure for DL MU transmission. The STAs 104 obtains the respective transmit beamforming matrices directly from the data of the respective feedback frames 806 for UL MU transmission.

According to the fourth embodiment of the present disclosure, since the trigger frames 808 and the feedback frames 806 are transmitted to the STAs in the UL group in the same DL MU PPDU, the channel efficiency is improved compared to the third embodiment where the trigger frame 708 and the feedback frames 706 are transmitted by the AP 102 separately to the STAs in the UL group.

According to the fourth embodiment of the present disclosure, each of the trigger frames 808 prompts a particular STA in the UL group to transmit data to the AP 102 at a particular time. Each of the trigger frames 808 also includes information on the designated transmission scheme and/or the allocated transmission resource for a particular STA in the UL group.

According to the fourth embodiment of the present disclosure, the feedback frame 806 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; (vi) one or more quality indicators corresponding to the entire bandwidth for the particular STA; (vii) beamforming feedback corresponding to the entire bandwidth for the particular STA; and (viii) power control information (e.g. required power adjustment amount), etc.

According to the fourth embodiment of the present disclosure, what is included in the beamforming feedback corresponding to the entire bandwidth or a candidate subband for a particular STA depends on the intended usage of transmission scheme for the entire bandwidth or the candidate subband for the particular STA. If the entire bandwidth or a candidate subband should be used only for UL SU-MIMO transmission, the beamforming feedback corresponding to the entire bandwidth or the candidate subband shall represent the transmit beamforming matrices specific to UL SU-MIMO transmission. If the entire bandwidth or a candidate subband should be used only for UL MU-MIMO transmission, the beamforming feedback corresponding to the entire bandwidth or the candidate subband shall represent the transmit beamforming matrices specific to UL MU-MIMO transmission. If the entire bandwidth or a candidate subband should be used for UL SU-MIMO or UL MU-MIMO transmission, the beamforming feedback corresponding to the entire bandwidth or the candidate subband shall represent both the transmit beamforming matrices specific to UL SU-MIMO transmission and the transmit beamforming matrices specific to UL MU-MIMO transmission.

During a time interval 832, if the trigger frames 808 trigger an UL MU-MIMO transmission, the STAs in the UL group (i.e., STAs 104-1 and 104-2 in this example) transmit respective data 810 simultaneously to the AP 102 over the entire bandwidth using respective transmit beamforming matrices specific to UL MU-MIMO transmission over the entire bandwidth. If the trigger frames 808 trigger an UL OFDMA transmission, the STAs in the UL group transmit respective data 810 simultaneously to the AP 102 over respective allocated subbands using respective transmit beamforming matrices. These transmit beamforming matrices can be generated from respective feedback frames 806 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 806-1.

Fifth Embodiment

Figure 9:
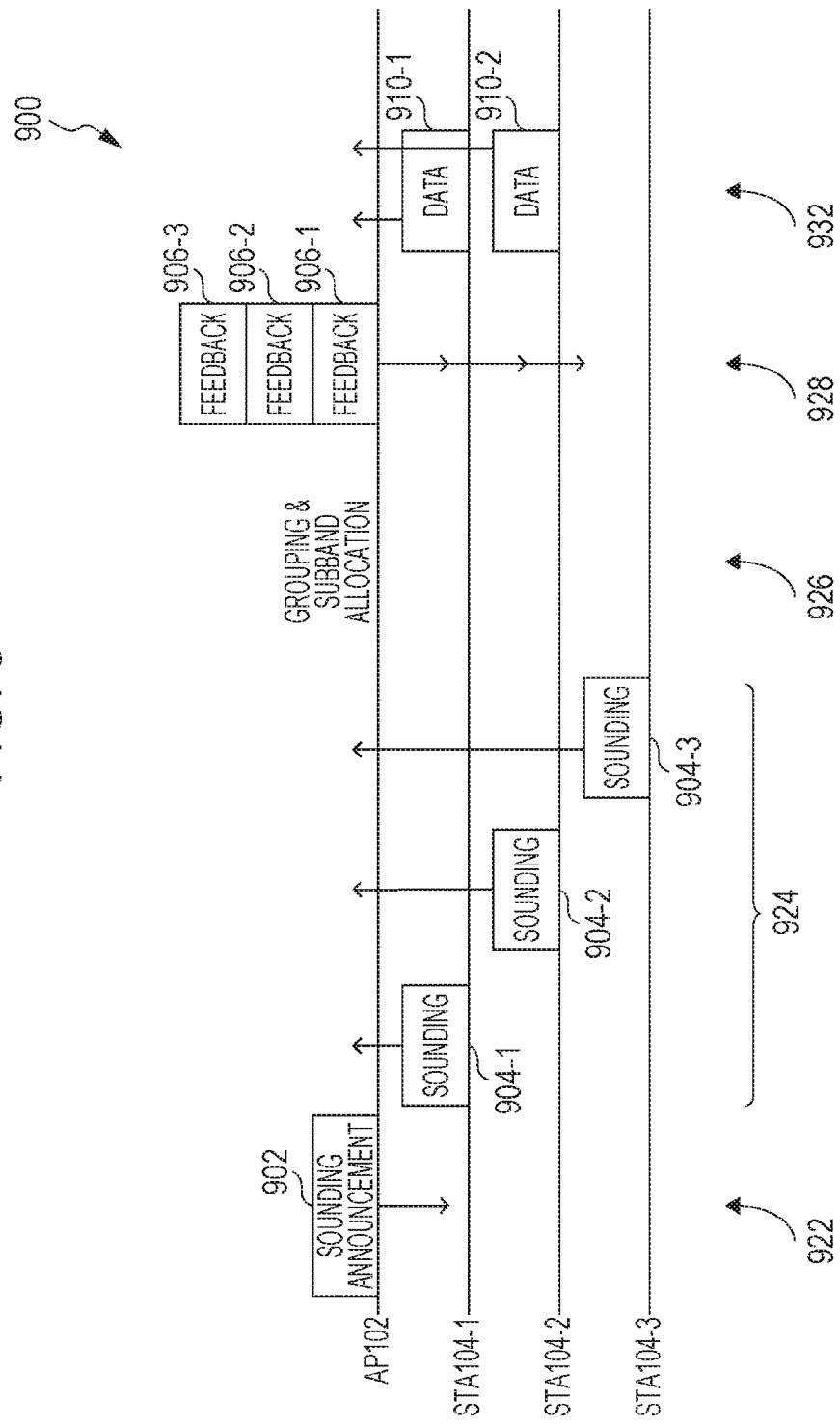
FIG. 9 shows a schematic timing diagram illustrating an example sounding procedure and an example UL MU transmission based on the example sounding procedure, according to a fifth embodiment of the present disclosure.

FIG. 9 is a schematic timing diagram illustrating an example sounding procedure 900 and an example UL MU transmission based on the sounding procedure 900, according to a fifth embodiment of the present disclosure. Similar to the sounding procedure 400 of FIG. 9, the sounding procedure 900 is also an explicit sounding procedure.

During a time interval 922, the AP 102 transmits a sounding announcement frame 902 to the STAs 104 to initiate the sounding procedure 900. The sounding announcement frame 902 contains information to coordinate the timing when the STAs 104 transmit respective sounding frames. For example, payload of the sounding announcement frame 902 can indicate an ordering of the STAs 104 that are requested to transmit sounding frames.

During a time interval 924, in response to receiving the sounding announcement frame 902, the STAs 104 sequentially transmit respective sounding frames 904 to the AP 102 according to the timing information included in the sounding announcement frame 902. In this example, the STA 104-1 sends a sounding frame 904-1 to the AP 102, followed by the STA 104-2 and the STA 104-3. Each of the sounding frames 904 includes suitable training signals in the PHY preamble (e.g., HE-LTF field). Each of the sounding frames 904 may also include UL power control information for the STA 104 transmitting the sounding frame (e.g., transmit power, power adjustable range and/or power headroom) in the PHY preamble (e.g., HE-SIG-A field). Each of the sounding frames 904 may be a NDP. The AP 102 obtains, based on training information included in each of the sounding frames 904, channel state information (e.g., gain, phase, SNR, etc.) corresponding to the entire bandwidth of the communication channel from each of the STAs 104 to the AP 102. Additionally or alternatively, the AP 102 determines quality indicators (e.g., SNR, SNIR, signal strength, etc.) corresponding to each of one or more subbands of the communication channel from each of the STAs 104 to the AP 102. The AP 102 further identifies one or more candidate subbands for each of the STAs 104 to be used for UL transmission.

According to the fifth embodiment of the present disclosure, based on the channel state information corresponding to the entire bandwidth of the communication channel from each of the STAs 104 to the AP 102 and/or quality indicators corresponding to the one or more subbands of the communication channel from each of the STAs 104 to the AP 102, the AP 102 identifies intended usage of transmission scheme for the entire bandwidth and/or each of the one or more candidate subbands for each of the STAs 104. For example, the AP 102 determines whether the entire bandwidth or each of the candidate subbands for each of the STA 104 that should be used for UL SU-MIMO transmission, UL MU-MIMO transmission or both.

According to the fifth embodiment of the present disclosure, if the AP 102 determines the entire bandwidth or a candidate subband of the communication channel from a STA to the AP 102 should be used only for UL SU-MIMO transmission by a STA, the AP 102 calculates the transmit beamforming matrices for the STA specific to UL SU-MIMO transmission over the entire bandwidth or the candidate subband in a similar manner to the first embodiment.

According to the fifth embodiment of the present disclosure, if the AP 102 determines the entire bandwidth or a candidate subband should be used only for UL MU-MIMO transmission by a group of STAs, the AP 102 calculates the transmit beamforming matrices for each STA in the group specific to UL MU-MIMO transmission over the entire bandwidth or the candidate subband in a similar manner to the first embodiment.

According to the fifth embodiment of the present disclosure, if the AP 102 determines the entire bandwidth or a candidate subband should be used for UL SU-MIMO transmission by a STA or UL MU-MIMO transmission by a group of STAs, the AP 102 calculates both the transmit beamforming matrices for the STA specific to UL SU-MIMO transmission and the transmit beamforming matrices for each STA in the group specific to UL MU-MIMO transmission over the entire bandwidth or the candidate subband.

During a time interval 926, the AP 102 selects STAs for inclusion into an UL group for UL MU transmission based on the channel state information corresponding to the entire bandwidth, quality indicators corresponding to the one or more subbands of the communication channel and/or data buffer status obtained for at least some of the STAs 104. The AP 102 shall also designate respective transmission schemes and allocate respective transmission resources (e.g., subbands in terms of UL OFDMA) to the STAs in the UL group.

During a time interval 928, the AP 102 transmits respective feedback frames 906 to the STAs 104 in the UL group simultaneously in a DL MU PPDU. In this example, the AP 102 transmits the feedback frames 906-1, 906-2 and 906-3 to the STAs 104-1, 104-2 and 104-3, respectively, in a DL MU PPDU. Note that the transmit beamforming matrices to be used by the AP 102 for each of the STAs 104 in DL MU transmission shall be obtained in advance via a sounding procedure for DL MU transmission. The STAs 104 obtain the respective transmit beamforming matrices directly from the data of the respective feedback frames 906 for UL MU transmission.

According to the fifth embodiment of the present disclosure, the feedback frame 806 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; (vi) one or more quality indicators corresponding to the entire bandwidth for the particular STA; (vii) beamforming feedback corresponding to the entire bandwidth for the particular STA; and (viii) power control information (e.g. required power adjustment amount), etc.

According to the fifth embodiment of the present disclosure, each of the feedback frames for the STAs in the UL group (e.g., 906-1 or 906-2 in this example) also contains trigger information to prompt a particular STA in the UL group to transmit data to the AP 102 at a particular time and inform the designated transmission scheme and/or the allocated transmission resource to a particular STA in the UL group.

According to the fifth embodiment of the present disclosure, since no separate trigger frames are transmitted to the STAs in the UL group, channel efficiency is improved compared to the fourth embodiment where the separate trigger frames 808 are transmitted by the AP 102 to the STAs in the UL group.

According to the fifth embodiment of the present disclosure, what is included in the beamforming feedback corresponding to the entire bandwidth or a candidate subband for a particular STA depends on the intended usage of transmission scheme for the entire bandwidth or the candidate subband for the particular STA. If the entire bandwidth or a candidate subband should be used only for UL SU-MIMO transmission, the beamforming feedback corresponding to the entire bandwidth or the candidate subband shall represent the transmit beamforming matrices specific to UL SU-MIMO transmission. If the entire bandwidth or a candidate subband should be used only for UL MU-MIMO transmission, the beamforming feedback corresponding to the entire bandwidth or the candidate subband shall represent the transmit beamforming matrices specific to UL MU-MIMO transmission. If the entire bandwidth or a candidate subband should be used for UL SU-MIMO or UL MU-MIMO transmission, the beamforming feedback corresponding to the entire bandwidth or the candidate subband shall represent both the transmit beamforming matrices specific to UL SU-MIMO transmission and the transmit beamforming matrices specific to UL MU-MIMO transmission.

During a time interval 932, if the trigger information included in the feedback frames 906 triggers an UL MU-MIMO transmission, the STAs in the UL group (i.e., STAs 104-1 and 104-2 in this example) transmit respective data 910 simultaneously to the AP 102 over the entire bandwidth using respective transmit beamforming matrices specific to UL MU-MIMO transmission over the entire bandwidth. If the trigger information included in the feedback frames 906 triggers an UL OFDMA transmission, the STAs in the UL group transmit respective data 910 simultaneously to the AP 102 over respective allocated subbands using respective transmit beamforming matrices which can be generated from respective feedback frames 906 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 906-1.

Sixth Embodiment

Figure 10:
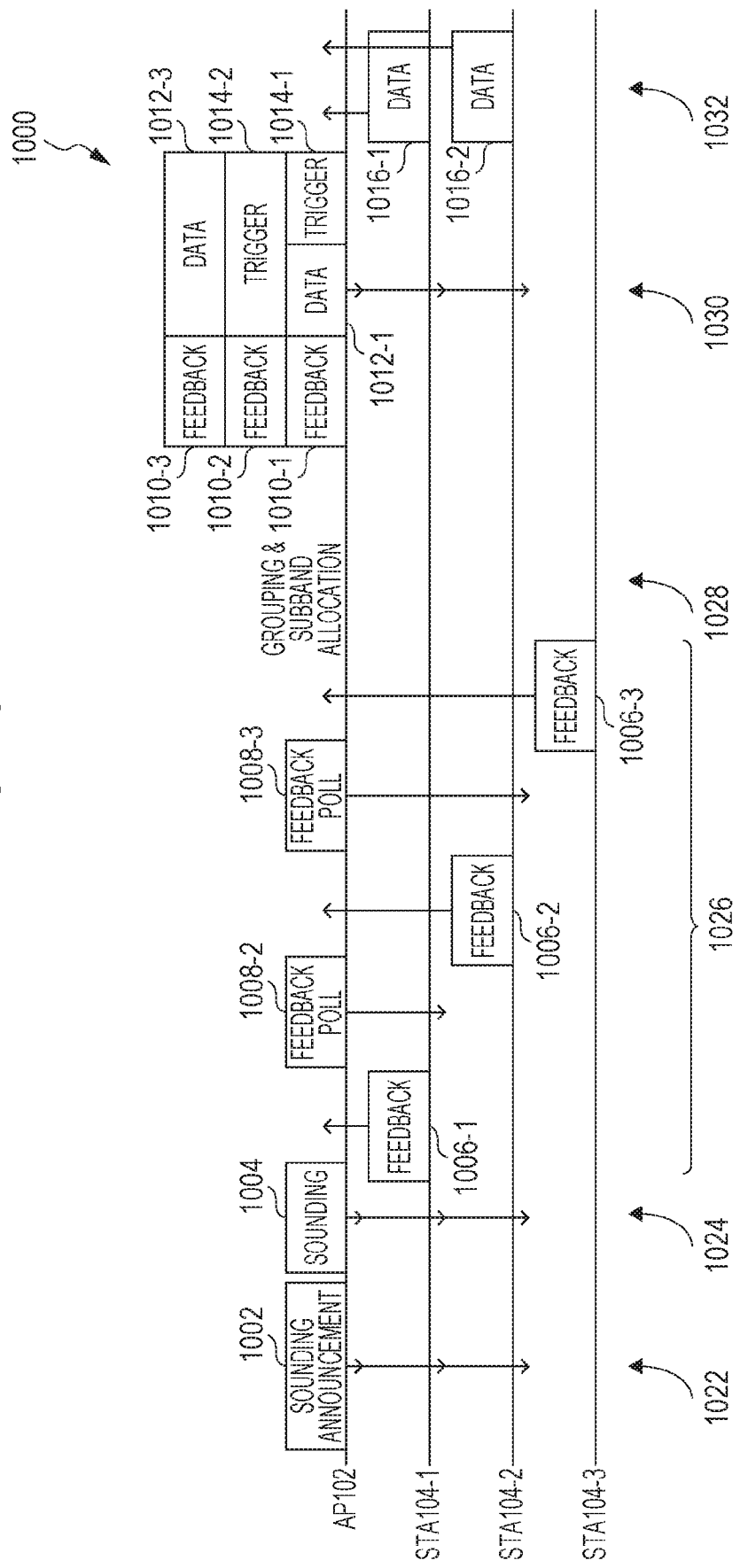
FIG. 10 shows a schematic timing diagram illustrating an example sounding procedure and an example UL MU transmission based on the example sounding procedure, according to a sixth embodiment of the present disclosure.

FIG. 10 is a schematic timing diagram illustrating an example sounding procedure 1000 and an example cascaded DL and UL MU transmission based on the sounding procedure 1000, according to a sixth embodiment of the present disclosure. Unlike the first five embodiments that address explicit UL sounding only, the sounding procedure 1000 is an explicit bidirectional sounding procedure in which explicit DL sounding and explicit UL sounding are jointly performed in an efficient manner.

During a time interval 1022, the AP 102 transmits a sounding announcement frame 1002 to the STAs 104 to initiate the sounding procedure 1000. The sounding announcement frame 1002 contains information to identify the STAs 104 that are intended participants in the sounding procedure 1000. For example, the sounding announcement frame 1002 identifies the STAs 104 by including a suitable identifier, such as at least a portion of an association identifier (AID), corresponding to each of the STAs 104 identified as an intended participant.

During a time interval 1024, as a part of explicit DL sounding, the AP 102 transmits a sounding frame 1004 that includes suitable training signals in the PHY preamble (e.g., HE-LTF field) and may be a NDP. Each of the STAs 104 identified by the sounding announcement frame 1002 obtains, based on training signals included in the sounding frame 1004, DL channel state information (e.g., the gain, the phase and SNR, etc.) corresponding to the entire bandwidth of the communication channel from the AP 102 and the STA 104. Additionally or alternatively, each of the STAs 104 determines DL quality indicators (e.g., SNR, SNIR, signal strength, etc.) corresponding to each of one or more subbands of the communication channel from the AP 102 and the STA 104. The STA 104 further identifies one or more preferred subbands, and determines an order of preference of the identified preferred subbands for DL transmission.

During a time interval 1026, as a part of explicit DL sounding, the STA 104-1 that is identified first in the sounding announcement frame 1002 transmits its feedback frame 1006-1. The AP 102 receives the feedback frame 1006-1 from the STA 104-1 and then successively transmits respective feedback poll frames 1008 to each of the remaining STAs 104 identified by the sounding announcement frame 1002 as participants in the sounding procedure 1000. Each of the remaining STAs 104 transmits its feedback frame 1006 accordingly.

A feedback frame 1006 from a particular STA includes one or more of (i) indications of one or more preferred subbands identified by the particular STA; (ii) indications of order of preference of the one or more preferred subbands identified by the particular STA; (iii) one or more DL quality indicators corresponding to each of the one or more preferred subbands identified by the particular STA; (iv) DL beamforming feedback, corresponding to each of the one or more preferred subbands identified by the particular STA; (v) DL channel state information corresponding to the entire bandwidth of the communication channel between the AP 102 and the particular STA; (vi) one or more DL quality indicators corresponding to the entire bandwidth of the communication channel from the AP 102 to the particular STA, and (vii) DL beamforming feedback corresponding to the entire bandwidth of the communication channel from the AP 102 to the particular STA, etc. The beamforming feedback may be a compressed beamforming feedback similar to what is defined in the IEEE 802.11ac standard. Alternatively, the beamforming feedback may be another suitable form of beamforming feedback, such as uncompressed beamforming feedback.

According to the sixth embodiment of the present disclosure, a feedback frame 1006 for explicit DL sounding also functions as a sounding frame for explicit UL sounding. In other words, in addition to training signals included in the PHY preamble (e.g., HE-LTF field) that are used by the receiver for demodulating the data portion of the feedback frame 1006, the feedback frame 1006 needs to include suitable additional training signals in the PHY preamble (e.g., a new field immediately after HE-LTF field) in order to provide additional reference for UL sounding so that the receiver can form an estimate of additional dimensions of the channel beyond those that are used by the data portion of the feedback frame 1006. Each of the feedback frames 1006 may also include UL power control information for the STA transmitting the feedback frame (e.g., transmit power, power adjustable range and/or power headroom) in the PHY preamble (e.g., HE-SIG-A field).

Based on the feedback frames 1006 received by the AP 102 during the time interval 1026, the AP 102 obtains one or more DL quality indicators and DL transmit beamforming matrices corresponding to the entire bandwidth and/or one or more subbands of the communication channel from the AP 102 to each of the STAs 104. For example, the AP 102 obtains the one or more DL quality indicators and/or transmit beamforming matrices for a particular STA 104 directly from the feedback frame 1006 received from the particular STA 104. Alternatively, the AP 102 determines the one or more DL quality indicators and/or transmit beamforming matrices for a particular STA 104 based on data included in the feedback frame 1006 received from the particular STA 104, such as based on DL channel state information included in the feedback frame 1006 received from the particular STA 104.

On the other hand, the AP 102 obtains, based on training signals and additional training signals included in each of the feedback frames 1006, UL channel state information (e.g., gain, phase, SNR, etc.) corresponding to the entire bandwidth of the communication channel from each of the STAs 104 to the AP 102. Additionally or alternatively, the AP 102 determines UL quality indicators (e.g., SNR, SNIR, signal strength, etc.) corresponding to each of one or more subbands of the communication channel from each of the STAs 104 to the AP 102. The AP 102 further identifies one or more candidate subbands for each of the STAs 104 to be used for UL transmission.

According to the sixth embodiment of the present disclosure, based on the UL channel state information corresponding to the entire bandwidth of the communication channel from each of the STAs 104 to the AP 102 and/or UL quality indicators corresponding to the one or more candidate subbands of the communication channel from each of the STAs 104 to the AP 102, the AP 102 identifies intended usage of transmission scheme for the entire bandwidth and/or each of the one or more candidate subbands for each of the STAs 104. For example, the AP 102 determines whether the entire bandwidth or each of the one or more candidate subbands for each of the STA 104 should be used for UL SU-MIMO transmission, UL MU-MIMO transmission or both.

According to the sixth embodiment of the present disclosure, if the AP 102 determines the entire bandwidth or a candidate subband should be used only for UL SU-MIMO transmission by a STA, the AP 102 develops the UL transmit beamforming matrices for the STA specific to UL SU-MIMO transmission over the entire bandwidth or the candidate subband in a similar manner to the first embodiment.

According to the sixth embodiment of the present disclosure, if the AP 102 determines the entire bandwidth or a candidate subband should be used only for UL MU-MIMO transmission by a group of STAs, the AP 102 develops the UL transmit beamforming matrices for each STA in the group specific to UL MU-MIMO transmission over the entire bandwidth or the candidate subband in a similar manner to the first embodiment.

According to the sixth embodiment of the present disclosure, if the AP 102 determines the entire bandwidth or a candidate subband should be used for UL SU-MIMO transmission by a STA or UL MU-MIMO transmission by a group of STAs, the AP 102 develops both the UL transmit beamforming matrices for the STA specific to UL SU-MIMO transmission and the UL transmit beamforming matrices for each STA in the group specific to UL MU-MIMO transmission over the entire bandwidth or the candidate subband.

During a time interval 1028, the AP 102 selects STAs for inclusion into a DL group for DL MU transmission based on the DL channel state information corresponding to the entire bandwidth and/or DL quality indicators corresponding to the one or more subbands of the communication channel obtained for at least some of the STAs 104 during the explicit DL sounding. The AP 102 shall also designate respective transmission schemes and allocate respective transmission resources (e.g., subbands in terms of DL OFDMA) to the STAs 104 including the STAs in the DL group. On the other hand, based on the UL channel state information corresponding to the entire bandwidth and/or UL quality indicators corresponding to the one or more subbands of the UL communication channel obtained for at least some of the STAs 104 during the explicit UL sounding, the AP 102 selects STAs for inclusion into an UL group for UL MU transmission. The AP 102 shall also designate respective transmission schemes and allocate respective transmission resources (e.g., subbands in terms of UL OFDMA) to the STAs in the UL group.

During a time interval 1030, the AP 102 transmits respective feedback frames 1010 to the STAs 104 simultaneously in respective transmission resources via a DL MU PPDU using respective transmit beamforming matrices which can be generated from the feedback frames 1006 according to the respective designated transmission schemes. For example, if the designated transmission scheme for a STA is DL SU-MIMO, then the transmit beamforming matrices specific to DL SU-MIMO transmission over the allocated subband for the STA are generated directly or indirectly from the corresponding data of the feedback frames 1006. The DL MU PPDU includes information on the designated transmission scheme and/or the allocated transmission resource for each of the STAs 104 in the PHY preamble (e.g., HE-SIG-B field). The AP 102 also transmits respective data 1012 to the STAs 104 in the DL group (e.g., STAs 104-1 and 104-3 in this example) and transmits respective trigger frames 1014 to the STAs in the UL group (e.g., STAs 104-1 and 104-2 in this example) in the same DL MU PPDU. In this example, the AP 102 transmits an aggregation of the feedback frame 1010-1, the data 1012-1 and the trigger frame 1014-1, an aggregation of the feedback frame 1010-2 and the trigger frame 1014-2 and an aggregation of the feedback frame 1010-3 and the data 1012-3 to the STAs 104-1, 104-2 and 104-3, respectively, in a DL MU PPDU. The STAs 104 obtain respective transmit beamforming matrices for UL MU transmission directly from the data of the received respective feedback frames 1010.

According to the sixth embodiment of the present disclosure, the feedback frame 1010 for a particular STA includes one or more of (i) indications of one or more candidate subbands for the particular STA; (ii) intended usage of transmission scheme corresponding to each of the one or more candidate subbands for the particular STA; (iii) one or more quality indicators corresponding to each of the one or more candidate subbands for the particular STA; (iv) beamforming feedback corresponding to each of the one or more candidate subbands for the particular STA; (v) intended usage of transmission scheme corresponding to the entire bandwidth for the particular STA; vi) one or more quality indicators corresponding to the entire bandwidth for the particular STA; (vii) beamforming feedback corresponding to the entire bandwidth for the particular STA; and (viii) power control information (e.g. required power adjustment amount), etc.

According to the sixth embodiment of the present disclosure, what is included in the beamforming feedback corresponding to the entire bandwidth or a candidate subband for a particular STA depends on the intended usage of transmission scheme for the entire bandwidth or the candidate subband for the particular STA. If the entire bandwidth or a candidate subband intends to be used only for UL SU-MIMO transmission, the beamforming feedback corresponding to the entire bandwidth or the candidate subband shall represent the transmit beamforming matrices specific to UL SU-MIMO transmission. If the entire bandwidth or a candidate subband intends to be used only for UL MU-MIMO transmission, the beamforming feedback corresponding to the entire bandwidth or the candidate subband shall represent the transmit beamforming matrices specific to UL MU-MIMO transmission. If the entire bandwidth or a candidate subband intends to be used for UL SU-MIMO or UL MU-MIMO transmission, the beamforming feedback corresponding to the entire bandwidth or the candidate subband shall represent both the transmit beamforming matrices specific to UL SU-MIMO transmission and the transmit beamforming matrices specific to UL MU-MIMO transmission.

According to the sixth embodiment of the present disclosure, each of the trigger frames 1014 prompts a particular STA in the UL group to transmit data to the AP 102 at a particular time. Each of the trigger frames 1014 also includes information on the designated transmission scheme and/or the allocated transmission resource for a particular STA in the UL group.

During a time interval 1032, if the trigger frames 1014 trigger an UL MU-MIMO transmission, the STAs in the UL group (i.e., STAs 104-1 and 104-2 in this example) transmit respective data 1016 simultaneously to the AP 102 over the entire bandwidth using respective transmit beamforming matrices specific to UL MU-MIMO transmission over the entire bandwidth. If the trigger frames 1014 trigger an UL OFDMA transmission, the STAs in the UL group transmit respective data 1016 simultaneously to the AP 102 over respective allocated subbands using respective transmit beamforming matrices which can be generated directly from the respective feedback frames 1010 according to the respective designated transmission schemes and the respective allocated subbands. For example, if the designated transmission scheme for the STA 104-1 is UL SU-MIMO, the transmit beamforming matrices specific to UL SU-MIMO transmission over the allocated subband for the STA 104-1 are generated directly from the corresponding data of the feedback frame 1010-1.

According to the sixth embodiment of the present disclosure, the sounding procedure 1000 begins with explicit DL sounding, followed by explicit UL sounding. The feedback frames 1006 transmitted by the STAs 104 to the AP 102 during explicit DL sounding also function as the sounding frames for explicit UL sounding. Since no dedicated sounding frames are required for explicit UL sounding, the sounding procedure 1000 as an explicit bidirectional sounding has a better channel efficiency than a sounding procedure where explicit DL sounding and explicit UL sounding are performed separately.

According to the present disclosure, the WLAN 100 may support multiple sounding procedures in order to increase system flexibility. For example, the WLAN 100 may support three types of sounding procedures: DL sounding procedure, UL sounding procedure and bidirectional sounding procedure. As a result, the sounding announcement frame sent by the AP 102 to the STAs 104 starting a sounding procedure may include information to indicate the type of the sounding procedure. In the example of FIG. 4, FIG. 6, FIG. 7, FIG. 8 or FIG. 9, the sounding announcement frame 402, 602, 702, 802 or 902 may include information to indicate the sounding procedure 400, 600, 700, 800 or 900 is an UL sounding procedure. In the example of FIG. 10, the sounding announcement frame 1002 may include information to indicate the sounding procedure 1000 is a bidirectional sounding procedure.

<Radio Communication Method>

Figure 11:
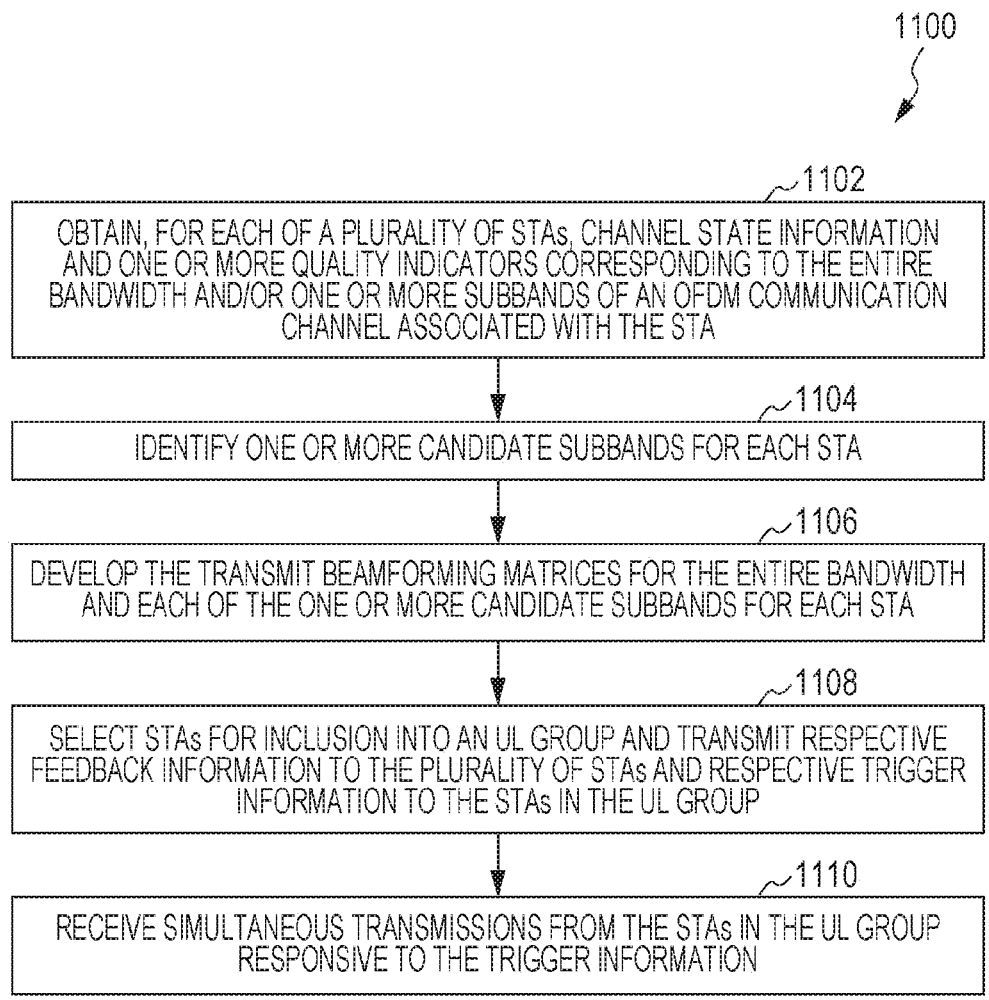
FIG. 11 shows a flow chart illustrating a first example method, implemented by AP, for performing sounding with STAs for UL MU transmission according to the present disclosure.

FIG. 11 is a flow chart illustrating a first example method 1100, implemented by a first communication device, for performing sounding with a plurality of second communication devices for UL MU transmission, according to the present disclosure. Merely for explanatory purposes, the method 1100 is discussed with reference to FIG. 4, FIG. 6, FIG. 7, FIG. 8 and FIG. 9, and is described in the context of the first communication device as an AP and the second communication devices as STAs. However, the first communication device may be a suitable communication device other than an AP, such as a node in a peer-to-peer network while the second communication devices may be suitable communication devices other than STAs, such as the nodes in a peer-to-peer network.

At step 1102, the AP obtains, for each STA of the plurality of STAs, channel state information and one or more quality indicators corresponding to the entire bandwidth and/or each of one or more subbands of an OFDM communication channel associated with the STA. Step 1102 includes transmitting one or more sounding announcement frames to the plurality of STAs; receiving a sounding frame from each STA of the plurality of STAs; and obtaining the channel state information and the one or more quality indicators corresponding to the entire bandwidth and/or each of the one or more subbands for each STA of the plurality of STAs based on the sounding frame received from the STA. In the example of FIG. 4 or FIG. 6, the AP 102 transmits respective sounding announcement frames 402 or 602 to request the STAs 104-1, 104-2 and 104-3, respectively, to transmit respective sounding frames 404 or 604. In the example of FIG. 7, FIG. 8 or FIG. 9, the AP 102 transmits a single sounding announcement frame 702, 802 or 902 to request the STAs 104-1, 104-2 and 104-3 to transmit respective sounding frames 704, 804 or 904.

At step 1104, the AP identifies, based on the quality indicators obtained for each STA of the plurality of STAs, one or more candidate subbands for the STA.

At step 1106, the AP develops, based on the channel state information and the quality indicators obtained for the plurality of STAs, the transmit beamforming matrices corresponding to the entire bandwidth and/or each of the one or more candidate subbands for each STA of the plurality of STAs. Step 1106 includes identifying, based on the quality indicators obtained for the plurality of STAs, transmission scheme for the entire bandwidth and/or each of the one or more candidate subbands for each STA of the plurality of STAs; and developing, based on the channel state information and quality indicators obtained for the plurality of STAs, the transmit beamforming matrices for the entire bandwidth and/or each of the one or more candidate subbands depending on respective intended usage of transmission scheme for each STA of the plurality of STAs. Step 1106 may also include calculating the required power adjustment amount for each STA of the plurality of STAs.

According to the method 1100, if a candidate subband or the entire bandwidth intends to be used only for UL SU-MIMO transmission, the transmit beamforming matrices specific to SU-MIMO transmission are developed for the candidate subband or the entire bandwidth. If a candidate subband or the entire bandwidth intends to be used only for UL MU-MIMO transmission, the transmit beamforming matrices specific to MU-MIMO transmission are developed for the candidate subband or the entire bandwidth. If a candidate subband or the entire bandwidth intends to be used for UL SU-MIMO or MU-MIMO transmission, both the transmit beamforming matrices specific to SU-MIMO transmission and the transmit beamforming matrices specific to MU-MIMO transmission are developed for the candidate subband or the entire bandwidth.

At step 1108, the AP selects, based on the quality indicators obtained for at least some of the plurality of STAs, a group of STAs for inclusion into an UL group for UL MU communications, and transmits respective feedback information to the plurality of STAs and respective trigger information to the STAs in the UL group, wherein the group includes two or more STAs of the plurality of STAs. In the example of FIG. 4, FIG. 6, FIG. 7, FIG. 8 or FIG. 9, the AP 102 selects the STAs 104-1 and 104-2 for inclusion into the UL group. The feedback information is described above with reference to FIG. 5. The trigger information for a STA in the UL group prompts the STA to simultaneously transmit to the AP with other STAs in the UL group at a particular time. The trigger information for a STA in the UL group includes information on the designated transmission scheme and/or the allocated transmission resource.

According to the method 1100, in one embodiment, the feedback information for each STA is included in a feedback frame addressed to the STA and the trigger information for each STA in the UL group is included in the feedback frame addressed to the STA. The feedback frames are transmitted by the AP to the plurality of the STAs simultaneously via a DL MU PPDU. In the example of FIG. 9, the AP 102 transmits the feedback frame 906-1 including feedback information and trigger information for the STA 104-1, the feedback frame 906-2 including feedback information and trigger information for the STA 104-2 and the feedback frame 906-3 including feedback information and trigger information for the STA 104-3 simultaneously.

According to the method 1100, in one embodiment, the feedback information for each STA is included in a feedback frame addressed to the STA and the trigger information for the STAs in the UL group is included in a trigger frame. The feedback frames are transmitted by the AP to the plurality of STAs simultaneously via a DL MU PPDU prior to transmission of the trigger frame to the STAs in the UL group. In the example of FIG. 4, the AP 102 transmits the feedback frames 406 sequentially to the STAs 104. In the example of FIG. 6 or FIG. 7, the AP 102 transmits the feedback frames 606 or 706 simultaneously to the STAs 104. After that, the AP 102 transmits the trigger frames 408, 608 or 708 to the STAs in the UL group.

According to the method 1100, in one embodiment, the feedback information for each STA is included in a feedback frame addressed to the STA and the trigger information for each STA in the UL group is included in a trigger frame addressed to the STA. An aggregation of the feedback frame and the trigger frame addressed to each STA in the UL group and the feedback frame addressed to each of the plurality of STAs which is not in the UL group are transmitted to the plurality of STAs simultaneously via a DL MU PPDU. In the example of FIG. 8, the AP 102 transmits an aggregation of the feedback frame 806-1 and the trigger frame 808-1 to the STA 104-1, an aggregation of the feedback frame 806-2 and the trigger frame 808-2 to the STA 104-2 and the feedback frame 806-3 to the STAs 104-3 simultaneously.

Figure 12:
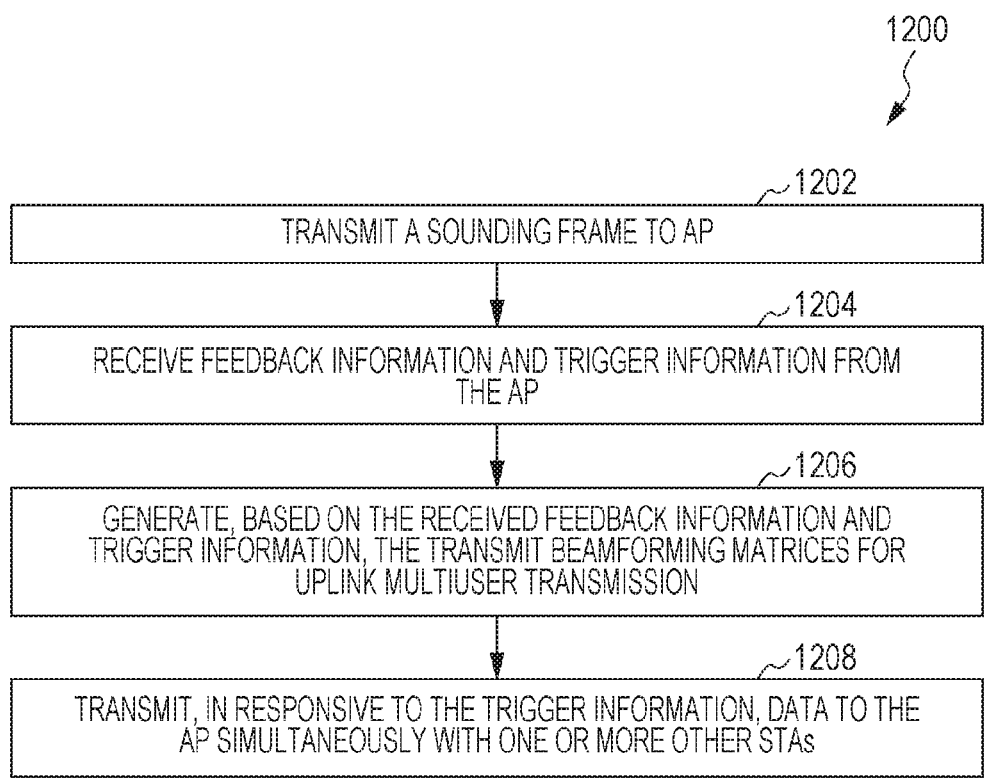
FIG. 12 shows a flow chart illustrating a first example method, implemented by STA, for performing sounding with AP for UL MU transmission according to the present disclosure.

At step 1110, the AP receives simultaneous transmission from the STAs in the UL group in response to the trigger information transmitted at step 1108. The simultaneous transmissions received at step 1110 were transmitted by the STAs in the UL group using the transmit beamforming matrices generated directly from the data included in the feedback information transmitted by the AP to the STAs in the UL group at step 1108. FIG. 12 is a flow chart illustrating a first example method 1200, implemented by one of a plurality of second communication devices, for performing sounding with a first communication device for UL MU transmission, according to the present disclosure. Merely for explanatory purposes, the method 1200 is discussed with reference to FIG. 4, FIG. 6, FIG. 7, FIG. 8 and FIG. 9, and is described in the context of the first communication device as an AP and the second communication devices as STAs. However, the first communication device may be a suitable communication device other than an AP, such as a node in a peer-to-peer network while the second communication devices may be suitable communication devices other than STAs, such as the nodes in a peer-to-peer network.

At step 1202, the STA transmits a sounding frame to the AP. Step 1202 include receiving a sounding announcement frame from the AP; and transmitting, in response to the received sounding announcement frame, the sounding frame to the AP. For example, in the example of FIG. 4, FIG. 6, FIG. 7, FIG. 8 or FIG. 9, the STA 104-1 transmits the sounding frame 404-1, 604-1, 704-1, 804-1 or 904-1 to the AP 102 in response to receiving the sounding announcement frame 402-1, 602-1, 702, 802 or 902.

At step 1204, the STA receives feedback information and trigger information from the AP. The feedback information is described above with reference to FIG. 5. The trigger information for the STA prompts the STA to simultaneously transmit to the AP with one or more other STAs at a particular time. The trigger information for the STA also includes information on the designated transmission scheme and/or the allocated transmission resource.

According to the method 1200, in one embodiment, the feedback information for the STA is included in a feedback frame addressed to the STA which also includes the trigger information for the STA. The STA receives the feedback information and the trigger information simultaneously. In the example of FIG. 9, the STA 104-1 receives the feedback frame 906-1 including the feedback information and the trigger information.

According to the method 1200, in one embodiment, the feedback information for the STA is included in a feedback frame addressed to the STA and the trigger information for the STA is included in a trigger frame addressed to the STA. The feedback frame and the trigger frame are received by the STA separately. In the example of FIG. 4, FIG. 6 or FIG. 7, the feedback frame 406-1, 606-1 or 706-1 is received by the STA 104-1 prior to the trigger frame 408, 608 or 708. Alternatively, an aggregation of the feedback frame and the trigger frame is received by the STA. In the example of FIG. 8, the STA 104-1 receives an aggregation of the feedback frame 806-1 and the trigger frame 808-1.

At step 1206, the STA generates, based on the received feedback information and trigger information, the transmit beamforming matrices for UL MU transmission. Step 1206 includes identifying, based on received trigger information, the designated transmission scheme and the allocated transmission resource; and generating, based on the designated transmission scheme and the allocated transmission resource, the transmit beamforming matrices for UL MU transmission directly from the corresponding data of the received feedback information.

According to the method 1200, if the received trigger information indicates UL MU-MIMO transmission over the entire bandwidth, the transmit beamforming matrices specific to UL MU-MIMO transmission over the entire bandwidth is generated directly from the corresponding data of the received feedback information. If the received trigger information indicates UL MU-MIMO transmission over the allocated subband, the transmit beamforming matrices specific to UL MU-MIMO transmission over the allocated subband is generated directly from the corresponding data of the received feedback information. If the received trigger information indicates UL SU-MIMO transmission over the allocated subband, the transmit beamforming matrices specific to UL SU-MIMO transmission over the allocated subband is generated directly from the corresponding data of the received feedback information.

At step 1208, the STA transmits, in responsive to the trigger information, data in the allocated transmission resource according to the AP simultaneously with the one or more other STAs using the transmit beamforming matrices generated at step 1206.

Figure 13:
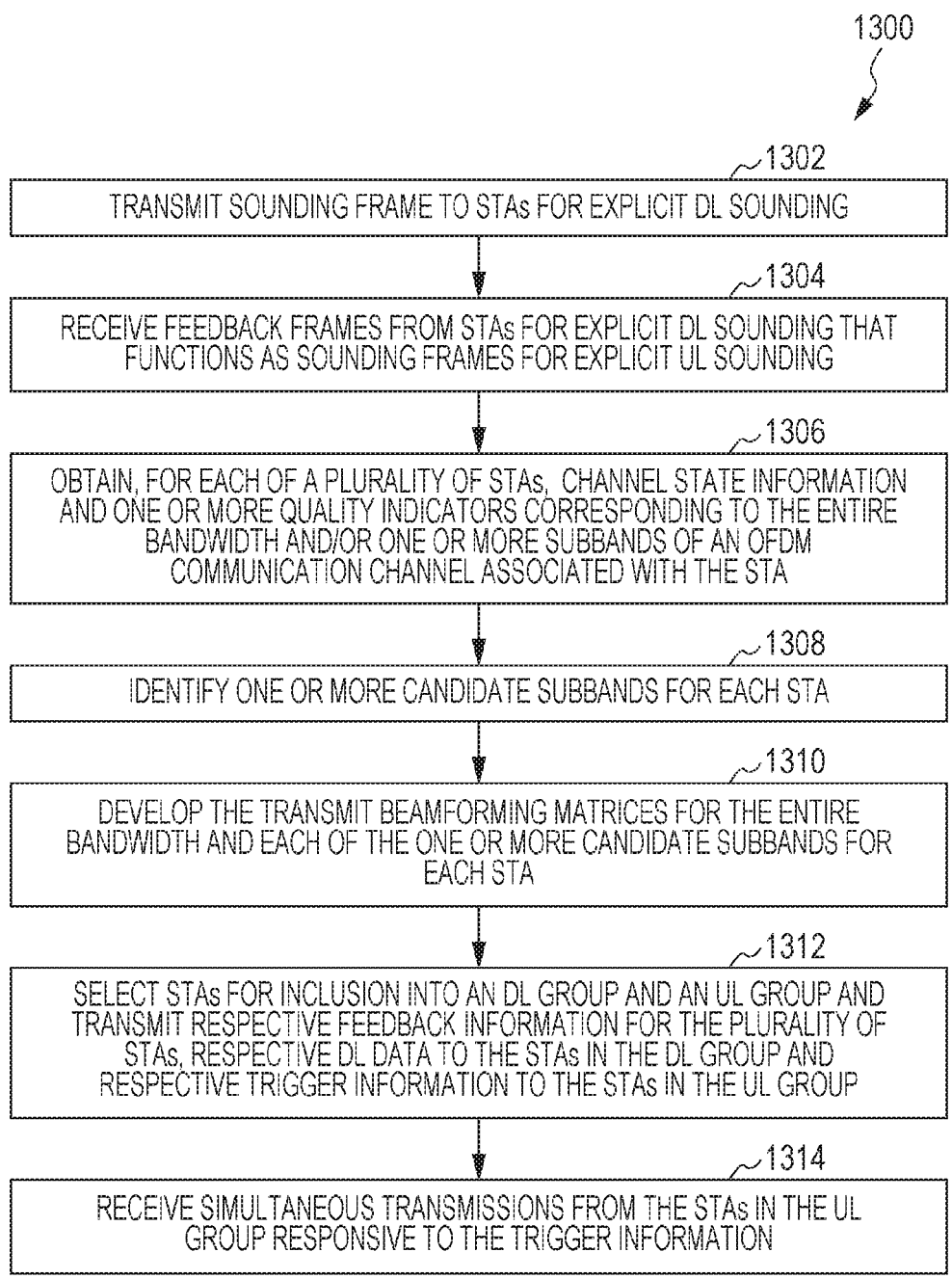
FIG. 13 shows a flow chart illustrating a second example method, implemented by AP, for performing sounding with STAs for cascaded DL and UL MU transmission according to the present disclosure.

FIG. 13 is a flow chart illustrating a second example method 1300, implemented by a first communication device, for performing sounding with a plurality of second communication devices for cascaded DL and UL MU transmission, according to the present disclosure. Merely for explanatory purposes, the method 1300 is discussed with reference to FIG. 10, and is described in the context of the first communication device as an AP and the second communication devices as STAs. However, the first communication device may be a suitable communication device other than an AP, such as a node in a peer-to-peer network while the second communication devices may be suitable communication devices other than STAs, such as the nodes in a peer-to-peer network.

At step 1302, the AP transmit a sounding frame as a part of explicit DL sounding to a plurality of STAs after transmitting a sounding announcement frame to them. In the example of FIG. 10, the AP 102 transmits a sounding announcement frame 1002 to the STAs 104-1, 104-2 and 104-3, followed by a sounding frame 1004.

At step 1304, the AP receives respective feedback frames for explicit DL sounding from the STAs that function also as respective sounding frames for explicit UL sounding. In the example of FIG. 10, the AP 102 receives the respective feedback frames 1006 from the STAs 104-1, 104-2 and 104-3. From the data of the feedback frames, the AP obtains the DL channel state information and the one or more DL quality indicators corresponding to the entire bandwidth and/or each of the one or more preferred subbands for each STA of the plurality of STAs.

At step 1306, as a part of explicit UL sounding, the AP obtains the UL channel state information and the one or more UL quality indicators corresponding to the entire bandwidth and/or each of the one or more subbands for each STA of the plurality of STAs based on training signals and additional training signals included in the feedback frame received from the STA.

At step 1308, the AP identifies, based on the UL quality indicators obtained for each STA of the plurality of STAs, one or more candidate subbands for the STA.

At step 1310, the AP develops, based on the UL channel state information and the UL quality indicators obtained for the plurality of STAs, the transmit beamforming matrices for the entire bandwidth and/or each of the one or more candidate subbands for each STA of the plurality of STAs. Step 1310 includes identifying, based on the UL quality indicators obtained for the plurality of STAs, intended usage of transmission scheme for the entire bandwidth and/or each of the one or more candidate subbands for each STA of the plurality of STAs; and developing, based on the UL channel state information and UL quality indicators obtained for the plurality of STAs, the transmit beamforming matrices for the entire bandwidth and/or each of the one or more candidate subbands depending on respective intended usage of transmission scheme for each STA of the plurality of STAs. Step 1310 may also include calculating the required power adjustment amount for each STA of the plurality of STAs.

According to the method 1300, if a candidate subband or the entire bandwidth intends to be used only for UL SU-MIMO transmission, the transmit beamforming matrices specific to SU-MIMO transmission are developed for the candidate subband or the entire bandwidth. If a candidate subband or the entire bandwidth intends to be used only for UL MU-MIMO transmission, the transmit beamforming matrices specific to MU-MIMO transmission are developed for the candidate subband or the entire bandwidth. If a candidate subband or the entire bandwidth intends to be used for UL SU-MIMO or MU-MIMO transmission, both the transmit beamforming matrices specific to SU-MIMO transmission and the transmit beamforming matrices specific to MU-MIMO transmission are developed for the candidate subband or the entire bandwidth.

At step 1312, the AP selects, based on the UL quality indicators obtained for at least some of the plurality of STAs, a group of STAs for inclusion into an UL group for UL MU transmission. The AP also selects, based on the DL quality indicators obtained for at least some of the plurality of STAs, a group of STAs for inclusion into a DL group for DL MU transmission. The DL or UL group includes two or more STAs of the plurality of STAs. The AP transmits respective feedback information to the plurality of STAs, the respective DL data to the STAs in the DL group and respective trigger information to the STAs in the UL group. In the example of FIG. 10, the AP 102 selects the STA 104-1 and the STA 104-3 for inclusion into the DL group and selects the STA 104-1 and the STA 104-2 for inclusion into the UL group. The feedback information is described above with reference to FIG. 5. The trigger information for a STA in the UL group prompts the STA to simultaneously transmit to the AP with other STAs in the UL group at a particular time. The trigger information for a STA in the UL group also includes information on the designated transmission scheme and/or the allocated transmission resource.

According to the method 1300, in one embodiment, the feedback information for each STA is included in a feedback frame addressed to the STA and the trigger information for each STA in the UL group is included in a trigger frame addressed to the STA. An aggregation of the feedback frame, the DL data and the trigger frame addressed to each STA in the DL and UL groups and the feedback frame and the DL data addressed to each STA which is not in the UL group and but in the DL group, the feedback frame addressed to each STA which is not in the UL or DL group are transmitted to the plurality of STAs simultaneously via a DL MU PPDU. In the example of FIG. 10, the AP 102 transmits an aggregation of the feedback frame 1010-1, the DL data 1012-1 and the trigger frame 1014-1 to the STA 104-1, an aggregation of the feedback frame 1010-2 and the trigger frame 1014-2 to the STA 104-2 and an aggregation of the feedback frame 1010-3 and the DL data 1012-3 to the STA 104-3, simultaneously.

At step 1314, the AP receives simultaneous transmission from the STAs in the UL group in response to the trigger information transmitted at step 1314. The simultaneous transmissions received at step 1314 were transmitted by the STAs in the UL group using the transmit beamforming matrices generated directly from the data included in the feedback information transmitted by the AP to the STAs in the UL group at step 1314.

Figure 14:
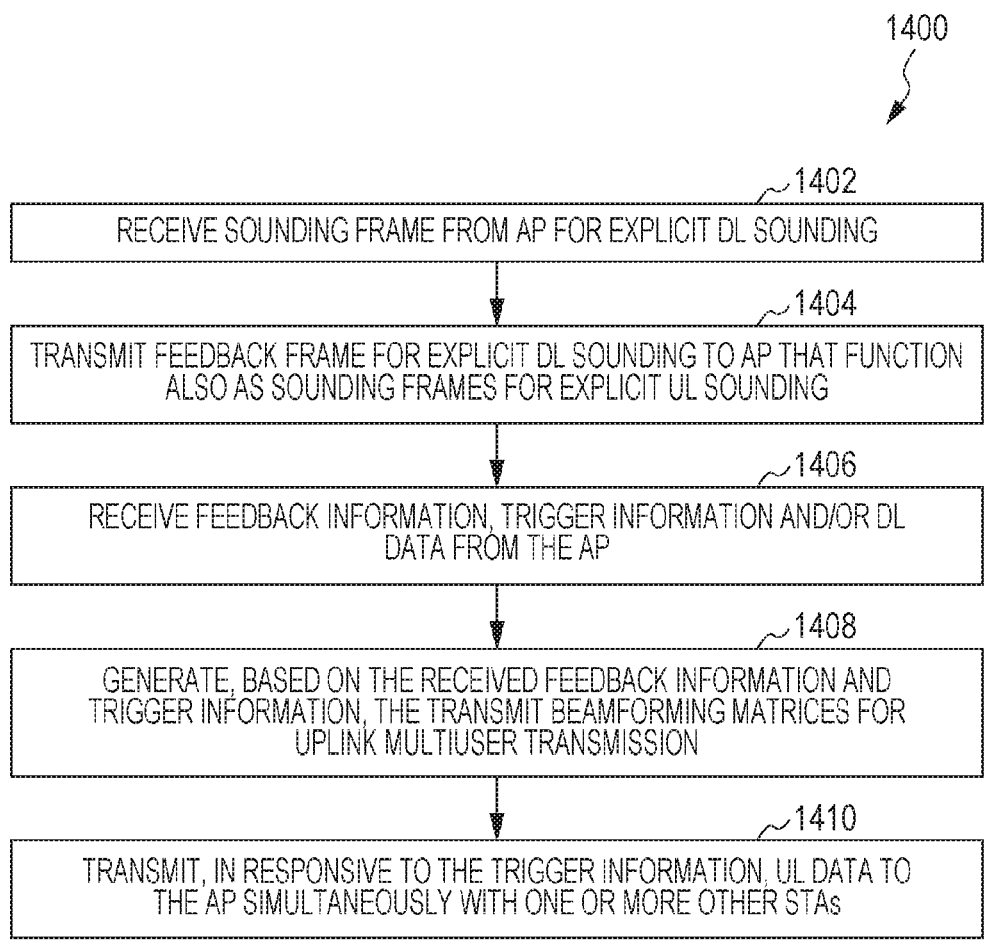
FIG. 14 shows a flow chart illustrating a second example method, implemented by STA, for performing sounding with AP for cascaded DL an UL MU transmission according to the present disclosure.

FIG. 14 is a flow chart illustrating a first example method 1400, implemented by one of a plurality of second communication devices, for performing sounding with a first communication device for UL MU transmission, according to the present disclosure. Merely for explanatory purposes, the method 1400 is discussed with reference to FIG. 10, and is described in the context of the first communication device as an AP and the second communication devices as STAs. However, the first communication device may be a suitable communication device other than an AP, such as a node in a peer-to-peer network while the second communication devices may be suitable communication devices other than STAs, such as the nodes in a peer-to-peer network.

At step 1402, the STA receives a sounding frame from the AP for explicit DL sounding after receiving a sounding announcement frame from the AP that starts a sounding procedure. In the example of FIG. 10, the STA 104-1 receives the sounding frame 1004 from the AP 102 after receiving the sounding announcement frame 1002.

At step 1404, the STA transmits a feedback frame for explicit DL sounding to the AP in response to receiving the sounding frame at step 1402 that functions also as a sounding frame for explicit UL sounding. For example, in the example of FIG. 10, the STA 104-1 transmits the feedback frame 1006-1 to the AP 102 that is used for both explicit DL sounding and explicit UL sounding.

At step 1406, the STA receives feedback information for explicit UL sounding and trigger information from the AP. The feedback information is described above with reference to FIG. 5. The trigger information for the STA prompts the STA to simultaneously transmit to the AP with one or more other STAs at a particular time. The trigger information for the STA also includes information on the designated transmission scheme and/or the allocated transmission resource.

According to the method 1400, in one embodiment, the feedback information for the STA is included in a feedback frame addressed to the STA and the trigger information for the STA is included in a trigger frame addressed to the STA. An aggregation of the feedback frame, the trigger frame and/or the DL data is received by the STA. In the example of FIG. 10, the STA 104-1 receives an aggregation of the feedback frame 1010-1, the DL data 1012-1 and the trigger frame 1014-1.

At step 1408, the STA generates, based on the received feedback information and trigger information, the transmit beamforming matrices for UL MU transmission. Step 1408 includes identifying, based on received trigger information, the designated transmission scheme and the allocated transmission resource; and generating, based on the designated transmission scheme and the allocated transmission resource, the transmit beamforming matrices for UL MU transmission directly from the corresponding data of the received feedback information.

According to the method 1400, if the received trigger information indicates UL MU-MIMO transmission over the entire bandwidth, the transmit beamforming matrices specific to UL MU-MIMO transmission over the entire bandwidth is generated directly from the corresponding data of the received feedback information. If the received trigger information indicates UL MU-MIMO transmission over the allocated subband, the transmit beamforming matrices specific to UL MU-MIMO transmission over the allocated subband is generated directly from the corresponding data of the received feedback information. If the received trigger information indicates UL SU-MIMO transmission over the allocated subband, the transmit beamforming matrices specific to UL SU-MIMO transmission over the allocated subband is generated directly from the corresponding data of the received feedback information.

At step 1410, the STA transmits, in responsive to the trigger information, UL data in the allocated transmission resource according to the AP simultaneously with the one or more other STAs using the transmit beamforming matrices generated at step 1408.

<Configuration of an Access Point>

Figure 15:
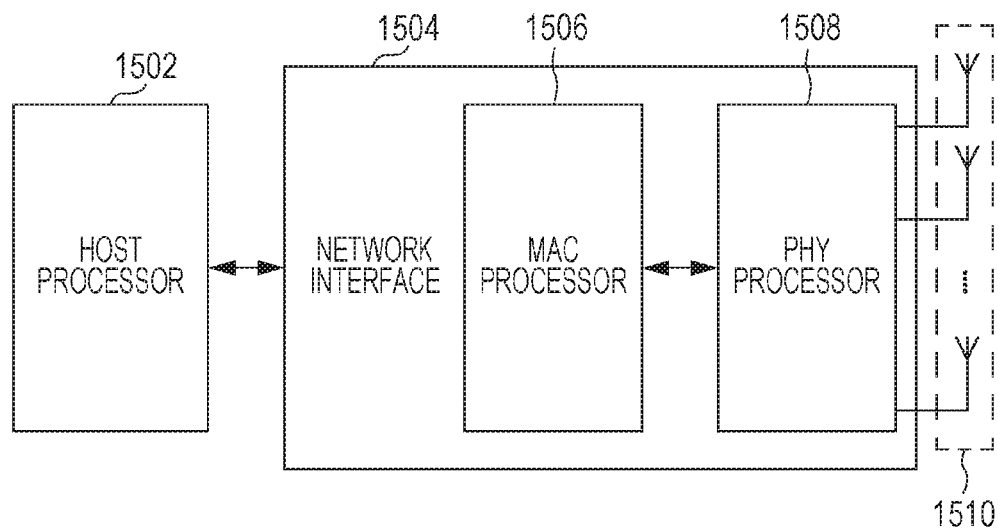
FIG. 15 shows a block diagram illustrating an example configuration of AP according to the present disclosure.

FIG. 15 is a block diagram illustrating example configuration of AP 102 according to the present disclosure. The AP 102 includes a host processor 1502 coupled to a network interface 1504. The network interface 1504 includes a MAC (Medium Access Control) processor 1506 and a PHY processor 1508. The PHY processor 1508 is coupled to multiple antennas 1510. The network interface 1504 (e.g., the MAC processor 1506 and/or the PHY processor 1508) is configured to perform sounding procedures with the STAs 104 and communicate data with the STAs 104 according to the abovementioned embodiments.

<Configuration of a STA>

Figure 16:
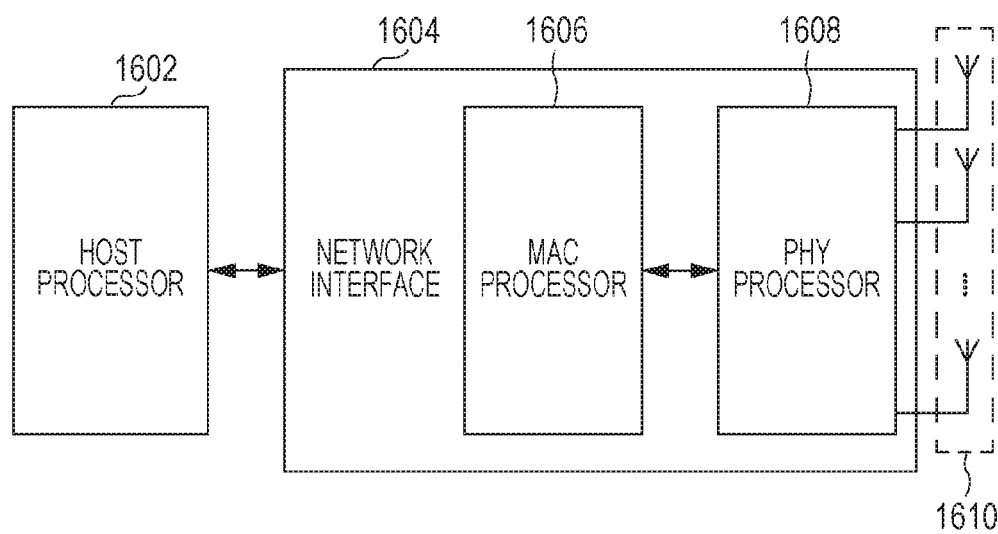
FIG. 16 shows a block diagram illustrating an example configuration of STA according to the present disclosure.

FIG. 16 is a block diagram illustrating example configuration of STA 104 according to the present disclosure. The STA 104 includes a host processor 1602 coupled to a network interface 1604. The network interface 1604 includes a MAC processor 1606 and a PHY processor 1608. The PHY processor 1608 is coupled to one or more antennas 1610. The network interface 1604 (e.g., the MAC processor 1606 and/or the PHY processor 1608) is configured to perform sounding procedures with the AP 102 and communicate data with the AP 102 according to the abovementioned embodiments.

This disclosure can be applied to a method for performing sounding for UL MU transmission in a wireless communications system.

What is claimed is:

1. A communication method implemented by a communication apparatus, the communication method comprising:
  generating a sounding frame comprising a training signal;
  transmitting the generated sounding frame;
  receiving a first feedback frame from a communication partner device, the first feedback frame comprising first beamforming feedback information and subband indication information, wherein,
  the first feedback frame is transmitted together with at least one second feedback frame by a multiuser transmission,
  the first beamforming feedback information corresponds to an entire bandwidth or one or more subbands, the one or more subbands being indicated by the subband indication information,
  one of the at least one second feedback frame includes second beamforming feedback information,
  the multiuser transmission is performed over a plurality of communication links, and
  the first beamforming feedback information includes information on one communication link of the plurality of communication links, and the second beamforming feedback information includes information on another communication link of the plurality of communication links.

2. The communication method according to claim 1, wherein the first feedback frame and the at least one second feedback frame, transmitted by the multiuser transmission, comprise first power control information.

3. The communication method according to claim 1, comprising:
  transmitting a frame comprising second power control information before receiving the first feedback frame.

4. The communication method according to claim 1, wherein the first beamforming feedback information corresponds to a plurality of subbands including the one or more subbands, and the subband indication information indicates the plurality of subbands.

5. The communication method according to claim 4, wherein the first feedback frame comprises a plurality of subfields containing the subband indication information, and the plurality of subfields indicate one or more tones corresponding to locations of the plurality of the subbands in a frequency domain.

6. The communication method according to claim 1, wherein the one or more subbands are resource units for an OFDMA transmission.

7. The communication method according to claim 1, wherein the subband indication information includes one or more tones corresponding to locations of the one or more subbands in a frequency domain.

8. The communication method according to claim 7, wherein the one or more tones correspond to a width of the one or more subbands.

9. A communication apparatus, comprising:
  a processor which, in operation, generates a sounding frame comprising a training signal; and
  an antenna which, in operation, transmits the generated sounding frame and receives a first feedback frame from a communication partner device, the first feedback frame comprising first beamforming feedback information and subband indication information, wherein,
  the first feedback frame is transmitted together with at least one second feedback frame by a multiuser transmission,
  the first beamforming feedback information corresponds to an entire bandwidth or one or more subbands, the one or more subbands being indicated by the subband indication information,
  one of the at least one second feedback frame includes second beamforming feedback information,
  the multiuser transmission is performed over a plurality of communication links, and
  the first beamforming feedback information includes information on one communication link of the plurality of communication links, and the second beamforming feedback information includes information on another communication link of the plurality of communication links.

10. The communication apparatus according to claim 9, wherein the first feedback frame and the at least one second feedback frame, transmitted by the multiuser transmission, comprise first power control information.

11. The communication apparatus according to claim 9, wherein the antenna, in operation, transmits a frame comprising second power control information before receiving the first feedback frame.

12. The communication apparatus according to claim 9, wherein the first beamforming feedback information corresponds to a plurality of subbands including the one or more subbands, and the subband indication information indicates the plurality of subbands.

13. The communication apparatus according to claim 12, wherein the first feedback frame comprises a plurality of subfields containing the subband indication information, and the plurality of subfields indicate one or more tones corresponding to locations of the plurality of the subbands in a frequency domain.

14. The communication apparatus according to claim 9, wherein the one or more subbands are resource units for an OFDMA transmission.

15. The communication apparatus according to claim 9, wherein the subband indication information includes one or more tones corresponding to locations of the one or more subbands in a frequency domain.

16. The communication apparatus according to claim 15, wherein the one or more tones correspond to a width of the one or more subbands.

* * * * *